United States Patent
Niu et al.

(10) Patent No.: US 12,003,417 B2
(45) Date of Patent: Jun. 4, 2024

(54) COMMUNICATION METHOD AND APPARATUS

(71) Applicant: Huawei Technologies Co., Ltd., Shenzhen (CN)

(72) Inventors: Junjie Niu, Nanjing (CN); Peng Dong, Nanjing (CN); Xiaofei Xu, Beijing (CN); Lei Han, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/472,888

(22) Filed: Sep. 22, 2023

(65) Prior Publication Data

US 2024/0022513 A1 Jan. 18, 2024

Related U.S. Application Data

(63) Continuation of application No. PCT/CN2022/076706, filed on Feb. 17, 2022.

(30) Foreign Application Priority Data

Mar. 25, 2021 (CN) .......................... 202110322442.8

(51) Int. Cl.
*H04L 45/745* (2022.01)
*H04L 45/24* (2022.01)
*H04L 61/103* (2022.01)

(52) U.S. Cl.
CPC ............ *H04L 45/745* (2013.01); *H04L 45/24* (2013.01); *H04L 61/103* (2013.01)

(58) Field of Classification Search
None
See application file for complete search history.

(56) References Cited

U.S. PATENT DOCUMENTS

| | | | |
|---|---|---|---|
| 9,807,007 B2* | 10/2017 | Vobbilisetty | H04L 45/745 |
| 2015/0172190 A1* | 6/2015 | Song | H04L 12/1886 |
| | | | 370/392 |
| 2019/0036736 A1* | 1/2019 | Gao | H04L 12/4633 |
| 2020/0259745 A1* | 8/2020 | Zhong | H04L 12/4633 |
| 2021/0328902 A1* | 10/2021 | Huselton | H04L 43/16 |
| 2023/0385264 A1* | 11/2023 | Veyry | G06F 16/2358 |

* cited by examiner

*Primary Examiner* — Quang N Nguyen
(74) *Attorney, Agent, or Firm* — Conley Rose, P.C.

(57) ABSTRACT

A communication method includes a first network device that receives a service packet from a first endpoint device, where a destination media access control (MAC) address of the service packet is a specific local MAC address of a second endpoint device, the specific local MAC address includes an indication prefix and location information, the indication prefix indicates that the specific local MAC address includes the location information, and the location information indicates an access location of an endpoint device in a network. The first network device determines an egress port from a preset routing table based on the location information in the specific local MAC address of the second endpoint device, and sends the service packet through the egress port, where the routing table includes the location information and the egress port corresponding to the location information.

18 Claims, 18 Drawing Sheets

| Indication prefix | Location information | User identifier |
|---|---|---|

FIG. 12A

| Indication prefix | Device identifier | Port identifier | User identifier |
|---|---|---|---|

Location information

FIG. 12B

COMMUNICATION METHOD AND APPARATUS

CROSS-REFERENCE TO RELATED APPLICATIONS

This is a continuation of International Patent Application No. PCT/CN2022/076706 filed on Feb. 17, 2022, which claims priority to Chinese Patent Application No. 202110322442.8 filed on Mar. 25, 2021. The disclosures of the aforementioned applications are hereby incorporated by reference in their entireties.

TECHNICAL FIELD

This disclosure relates to the field of communication technologies, and in particular, to a communication method and an apparatus.

BACKGROUND

In an existing Ethernet, communication between hosts may be performed through a layer 2 network. For example, a host 1 may broadcast an Address Resolution Protocol (ARP) request packet in a broadcast domain. After receiving the ARP request packet, a host 2 may send an ARP reply packet carrying a media access control (MAC) address of the host 2 to the host 1, so that the host 1 learns of the MAC address of the host 2 based on the ARP reply packet, and communicates with the host 2 based on the MAC address.

The host 1 broadcasts the ARP request packet in the broadcast domain. Consequently, a network device in the broadcast domain may generate a broadcast packet in a vicious cycle, causing a loop in the layer 2 network. Based on this, a virtual local area network (VLAN) may be introduced to perform filtering, isolation, and related processing on the broadcast domain, so that the layer 2 network is divided into different broadcast domains, and communication is established between different broadcast domains through a layer 3 network. When receiving a packet sent by the layer 2 network, the layer 3 network may determine whether a destination MAC address of the packet is a local MAC address, and if the destination MAC address of the packet is the local MAC address, terminate layer 2 network processing, parse an Internet Protocol (IP) address of the packet, and search a routing table based on the IP address for forwarding.

However, when the foregoing communication manner in which the layer 2 network and the layer 3 network are combined is used, division into broadcast domains through the VLAN increases packet processing complexity, and searching of the routing table based on the IP address causes a long packet forwarding delay. In addition, when the packet is forwarded, an uplink and a downlink need to be distinguished, processing is complex, and a layer 2 header of the packet needs to be frequently modified and replaced at each hop. This also increases the packet forwarding delay.

SUMMARY

In view of this, this disclosure provides a communication method and an apparatus, to resolve an existing technical problem that a packet forwarding delay is long when a packet is forwarded through a layer 2 network and a layer 3 network in an Ethernet.

According to a first aspect, an embodiment of this disclosure provides a communication method. The method may include the following. A first network device may receive a service packet from a first endpoint device, where a destination MAC address of the service packet is a specific local MAC address of a second endpoint device, the specific local MAC address includes an indication prefix and location information, the indication prefix indicates that the specific local MAC address includes the location information, and the location information indicates an access location of an endpoint device in a network. The first network device may determine an egress port in a preset routing table based on the location information in the specific local MAC address of the second endpoint device, and send the service packet through the egress port, where the routing table includes the location information and the egress port corresponding to the location information.

Based on the first aspect, the first network device may forward a packet based on the specific local MAC address and the routing table, that is, forward the packet based on a layer 2 network and a layer 3 network. The specific local MAC address including the location information is used, so that the first network device may perform linear table lookup based on a data plane, and forward the packet based on a table lookup result. In comparison with a network interconnection architecture in which the layer 2 network and the layer 3 network are combined for table lookup and forwarding based on an IP address, when performing table lookup and forwarding based on the specific local MAC address, the first network device may not need to perform processing such as modification and replacement on the service packet, so that a packet forwarding delay and forwarding processing complexity are reduced. This overcomes a disadvantage of the network interconnection architecture in which the layer 2 network and the layer 3 network are combined for table lookup and forwarding based on the IP address, and supports large-scale networking deployment. In addition, in comparison with a network architecture in which packet forwarding is performed based on the layer 2 network, a problem of a loop and a decrease in link utilization that are caused when packet forwarding is performed through the layer 2 network can be resolved.

In a possible design, the access location corresponding to the location information indicates a network device accessed by the endpoint device and a port through which the endpoint device accesses the network device.

Based on this possible design, the location information may indicate the network device accessed by the endpoint device and the port for accessing the network device. When forwarding the packet based on the specific local MAC address, the network device may perform table lookup and forwarding based on the location information in the specific local MAC address, and does not need to perform processing such as modification and replacement on the service packet, so that the packet forwarding delay and the forwarding processing complexity are reduced.

In a possible design, before that a first network device receives a service packet from a first endpoint device, the method further includes the following. The first network device receives an ARP request packet from the first endpoint device, where a source MAC address of the ARP request packet is an original MAC address corresponding to the first endpoint device, and a destination IP address of the ARP request packet is an IP address corresponding to the second endpoint device. The first network device modifies the source MAC address in an ARP header of the ARP request packet to a specific local MAC address of the first endpoint device, and broadcasts a modified ARP request packet.

Based on this possible design, after receiving the ARP request packet of the first endpoint device, the first network device may modify the original MAC address corresponding to the first endpoint device in the ARP request packet to the specific local MAC address of the first endpoint device, and send the modified ARP request packet, so that the second endpoint device learns of the specific local MAC address of the first endpoint device.

In a possible design, the original MAC address corresponding to the first endpoint device is an original MAC address of the first endpoint device.

In a possible design, the original MAC address corresponding to the first endpoint device is an original MAC address of a user corresponding to the first endpoint device.

Based on the foregoing two possible designs, the original MAC address corresponding to the first endpoint device may be the original MAC address of the first endpoint device, or may be the original MAC address of the user corresponding to the first endpoint device, so that the communication method provided in this disclosure is applicable to a single-user scenario, or is applicable to a multi-user scenario. This is not limited.

In a possible design, the first network device determines, based on the first network device accessed by the first endpoint device, a device identifier corresponding to the first endpoint device. The first network device determines, based on a port through which the first endpoint device accesses the first network device, a port identifier corresponding to the first endpoint device. The first network device determines location information of the first endpoint device based on the device identifier corresponding to the first endpoint device and the port identifier corresponding to the first endpoint device. The first network device determines the specific local MAC address of the first endpoint device based on the location information of the first endpoint device.

Based on this possible design, the first network device may determine the location information of the first endpoint device based on the device identifier and the port identifier that correspond to the first endpoint device, to determine the specific local MAC address of the first endpoint device. This provides a feasible solution for the first network device to determine the specific local MAC address of the first endpoint device.

In a possible design, the first network device obtains a first correspondence, where the first correspondence includes a port identifier and location information corresponding to the port identifier. The first network device determines, based on the first correspondence, the location information corresponding to a port through which the first endpoint device accesses the first network device as location information of the first endpoint device. The first network device determines the specific local MAC address of the first endpoint device based on the location information of the first endpoint device.

Based on this possible design, the first network device may alternatively determine the location information of the first endpoint device based on the first correspondence and the port through which the first endpoint device accesses the first network device, to determine the specific local MAC address of the first endpoint device. This provides another feasible solution for the first network device to determine the specific local MAC address of the first endpoint device.

In a possible design, the specific local MAC address further includes a user identifier that indicates the original MAC address of the user corresponding to the endpoint device.

Based on this possible design, the specific local MAC address may further include the user identifier. This provides a feasible solution for a multi-user scenario to which the communication method provided in this disclosure is applied.

In a possible design, the first network device determines location information of the first endpoint device based on a device identifier corresponding to the first endpoint device and a port identifier corresponding to the first endpoint device, or the first network device determines, based on a first correspondence including a port identifier and location information corresponding to the port identifier, the location information corresponding to a port through which the first endpoint device accesses the first network device as location information of the first endpoint device. The first network device determines, based on a second correspondence, the user identifier corresponding to the original MAC address of the user corresponding to the first endpoint device, where the second correspondence includes the original MAC address of the user and the user identifier corresponding to the original MAC address of the user. The first network device determines the specific local MAC address of the first endpoint device based on the location information of the first endpoint device and the user identifier corresponding to the original MAC address of the user corresponding to the first endpoint device.

Based on this possible design, the first network device may determine the user identifier of the first endpoint device based on the second correspondence, and further determine the specific local MAC address of the first endpoint device based on the location information and the user identifier of the first endpoint device. This provides a feasible solution for the first network device to determine the specific local MAC address of the first endpoint device.

In a possible design, the first network device determines, based on the first network device accessed by the first endpoint device, a device identifier corresponding to the first endpoint device. The first network device obtains a third correspondence, where the third correspondence includes the original MAC address of the user, and a port identifier and the user identifier that correspond to the original MAC address of the user. The first network device determines, based on the third correspondence, the port identifier and the user identifier that correspond to the original MAC address of the user corresponding to the first endpoint device. The first network device determines the specific local MAC address of the first endpoint device based on the device identifier corresponding to the first endpoint device, and the port identifier and the user identifier that correspond to the original MAC address of the user corresponding to the first endpoint device.

Based on this possible design, the first network device may alternatively determine the port identifier and the user identifier of the first endpoint device based on the third correspondence and the original MAC address corresponding to the first endpoint device, and determine location information of the first endpoint device based on the device identifier, the port identifier, and the user identifier that correspond to the first endpoint device, to determine the specific local MAC address of the first endpoint device. This provides another feasible solution for the first network device to determine the specific local MAC address of the first endpoint device.

In a possible design, a source IP address of the ARP request packet is an IP address corresponding to the first endpoint device, and when the IP address corresponding to the first endpoint device is an IP address of the user corresponding to the first endpoint device, the method further includes the following. The first network device stores, based on the ARP request packet, the IP address of the user corresponding to the first endpoint device and an original MAC address corresponding to the IP address.

Based on this possible design, when the source IP address of the ARP request packet is the IP address of the user corresponding to the first endpoint device, the first network device may further store the IP address and the original MAC address corresponding to the IP address, for subsequently determining the original MAC address corresponding to the IP address based on the IP address of the received packet.

In a possible design, the first network device obtains an ARP reply packet, where a destination MAC address of the ARP reply packet is the specific local MAC address of the first endpoint device, and a source MAC address in an ARP header of the ARP reply packet is the specific local MAC address of the second endpoint device. The first network device modifies the specific local MAC address of the first endpoint device in a layer 2 header of the ARP reply packet to the original MAC address corresponding to the first endpoint device. The first network device sends a modified ARP reply packet to the first endpoint device.

Based on this possible design, the first network device may further receive the ARP reply packet, and modify the specific local MAC address of the first endpoint device in the ARP reply packet to the original MAC address corresponding to the first endpoint device, so that the first endpoint device obtains the specific local MAC address of the second endpoint device based on the ARP reply packet without perceiving the specific local MAC address.

In a possible design, when the original MAC address corresponding to the first endpoint device is the original MAC address of the first endpoint device, the method further includes the following. The first network device obtains a fourth correspondence, where the fourth correspondence includes the port identifier and the original MAC address of the endpoint device corresponding to the port identifier. The first network device determines the original MAC address of the first endpoint device based on the fourth correspondence and the port identifier corresponding to the specific local MAC address of the first endpoint device.

Based on this possible design, the first network device may determine, based on the fourth correspondence and the port identifier corresponding to the specific local MAC address of the first endpoint device, the original MAC address corresponding to the first endpoint device. This provides a feasible solution for the first network device to determine the original MAC address corresponding to the first endpoint device.

In a possible design, when the original MAC address corresponding to the first endpoint device is the original MAC address of the user corresponding to the first endpoint device, the method further includes the following. The first network device obtains a fifth correspondence, where the fifth correspondence includes the user identifier and the original MAC address of the user corresponding to the user identifier. The first network device determines, based on the user identifier in the specific local MAC address of the first endpoint device, the original MAC address of the user corresponding to the first endpoint device.

Based on this possible design, the first network device may alternatively determine, based on the fifth correspondence and the user identifier in the specific local MAC address of the first endpoint device, the original MAC address corresponding to the first endpoint device. This provides another feasible solution for the first network device to determine the original MAC address corresponding to the first endpoint device.

In a possible design, when the original MAC address corresponding to the first endpoint device is the original MAC address of the user corresponding to the first endpoint device, the method further includes the following. The first network device obtains a sixth correspondence, where the sixth correspondence includes the port identifier and the user identifier, and the original MAC address of the user corresponding to the port identifier and the user identifier. The first network device determines, based on the port identifier and the user identifier that correspond to the specific local MAC address of the first endpoint device, the original MAC address of the user corresponding to the first endpoint device.

Based on this possible design, the first network device may alternatively determine, based on the sixth correspondence, and the port identifier and the user identifier that correspond to the specific local MAC address of the first endpoint device, the original MAC address corresponding to the first endpoint device. This provides another feasible solution for the first network device to determine the original MAC address corresponding to the first endpoint device.

In a possible design, when the original MAC address corresponding to the first endpoint device is the original MAC address of the user corresponding to the first endpoint device, a destination IP address of the ARP reply packet is the IP address of the user corresponding to the first endpoint device, and the method further includes the following. When the first network device stores the IP address of the user and the original MAC address corresponding to the IP address, the first network device determines, based on the destination IP address in the ARP reply packet, the original MAC address of the user corresponding to the first endpoint device.

Based on this possible design, the first network device may alternatively determine, based on the stored IP address of the user and the original MAC address corresponding to the IP address, the original MAC address corresponding to the first endpoint device. This provides another feasible solution for the first network device to determine the original MAC address corresponding to the first endpoint device.

According to a second aspect, an embodiment of this disclosure provides a first network device. The first network device may implement functions performed by the first network device in the first aspect or the possible designs in the first aspect. The functions may be implemented by hardware by executing corresponding software. The hardware or the software includes one or more modules corresponding to the functions, for example, a transceiver module and a processing module. The transceiver module is configured to receive a service packet from a first endpoint device, where a destination MAC address of the service packet is a specific local MAC address of a second endpoint device, the specific local MAC address includes an indication prefix and location information, the indication prefix indicates that the specific local MAC address includes the location information, and the location information indicates an access location of an endpoint device in a network. The processing module is configured to determine an egress port from a preset routing table based on the location information in the specific local MAC address of the second endpoint device. The transceiver module is further configured to send the service packet through the egress port, where the routing table includes the location information and the egress port corresponding to the location information.

In a possible design, the access location corresponding to the location information indicates a network device accessed by the endpoint device and a port through which the endpoint device accesses the network device.

In a possible design, before receiving the service packet from the first endpoint device, the transceiver module is further configured to receive an ARP request packet from the first endpoint device, where a source MAC address of the ARP request packet is an original MAC address corresponding to the first endpoint device, and a destination IP address of the ARP request packet is an IP address corresponding to the second endpoint device. The processing module is further configured to modify the source MAC address in an ARP header of the ARP request packet to a specific local MAC address of the first endpoint device. The transceiver module is further configured to broadcast a modified ARP request packet.

In a possible design, the original MAC address corresponding to the first endpoint device is an original MAC address of the first endpoint device.

In a possible design, the original MAC address corresponding to the first endpoint device is an original MAC address of a user corresponding to the first endpoint device.

In a possible design, the processing module is further configured to determine, based on the first network device accessed by the first endpoint device, a device identifier corresponding to the first endpoint device, determine, based on a port through which the first endpoint device accesses the first network device, a port identifier corresponding to the first endpoint device, determine location information of the first endpoint device based on the device identifier corresponding to the first endpoint device and the port identifier corresponding to the first endpoint device, and determine the specific local MAC address of the first endpoint device based on the location information of the first endpoint device.

In a possible design, the transceiver module is further configured to obtain a first correspondence, where the first correspondence includes a port identifier and location information corresponding to the port identifier. The processing module is configured to determine, based on the first correspondence, the location information corresponding to a port through which the first endpoint device accesses the first network device as location information of the first endpoint device, and determine the specific local MAC address of the first endpoint device based on the location information of the first endpoint device.

In a possible design, the specific local MAC address further includes a user identifier that indicates the original MAC address of the user corresponding to the endpoint device.

In a possible design, the processing module is further configured to determine location information of the first endpoint device based on a device identifier corresponding to the first endpoint device and a port identifier corresponding to the first endpoint device, or the processing module is further configured to determine, based on a first correspondence including a port identifier and location information corresponding to the port identifier, the location information corresponding to a port through which the first endpoint device accesses the first network device as location information of the first endpoint device. The processing module is further configured to determine, based on a second correspondence, the user identifier corresponding to the original MAC address of the user corresponding to the first endpoint device, where the second correspondence includes the original MAC address of the user and the user identifier corresponding to the original MAC address of the user. The processing module is further configured to determine the specific local MAC address of the first endpoint device based on the location information of the first endpoint device and the user identifier corresponding to the original MAC address of the user corresponding to the first endpoint device.

In a possible design, the processing module is further configured to determine, based on the first network device accessed by the first endpoint device, a device identifier corresponding to the first endpoint device. The transceiver module is further configured to obtain a third correspondence, where the third correspondence includes the original MAC address of the user, and a port identifier and the user identifier that correspond to the original MAC address of the user. The processing module is further configured to determine, based on the third correspondence, the port identifier and the user identifier that correspond to the original MAC address of the user corresponding to the first endpoint device, and determine the specific local MAC address of the first endpoint device based on the device identifier corresponding to the first endpoint device, and the port identifier and the user identifier that correspond to the original MAC address of the user corresponding to the first endpoint device.

In a possible design, a source IP address of the ARP request packet is an IP address corresponding to the first endpoint device, and when the IP address corresponding to the first endpoint device is an IP address of the user corresponding to the first endpoint device, the processing module is further configured to store, based on the ARP request packet, the IP address of the user corresponding to the first endpoint device and an original MAC address corresponding to the IP address.

In a possible design, the transceiver module is further configured to obtain an ARP reply packet, where a destination MAC address of the ARP reply packet is the specific local MAC address of the first endpoint device, and a source MAC address in an ARP header of the ARP reply packet is the specific local MAC address of the second endpoint device. The processing module is further configured to modify the specific local MAC address of the first endpoint device in a layer 2 header of the ARP reply packet to the original MAC address corresponding to the first endpoint device. The transceiver module is further configured to send a modified ARP reply packet to the first endpoint device.

In a possible design, when the original MAC address corresponding to the first endpoint device is the original MAC address of the first endpoint device, the transceiver module is further configured to obtain a fourth correspondence, where the fourth correspondence includes the port identifier and the original MAC address of the endpoint device corresponding to the port identifier. The processing module is further configured to determine the original MAC address of the first endpoint device based on the fourth correspondence and the port identifier corresponding to the specific local MAC address of the first endpoint device.

In a possible design, when the original MAC address corresponding to the first endpoint device is the original MAC address of the user corresponding to the first endpoint device, the transceiver module is further configured to obtain a fifth correspondence, where the fifth correspondence includes the user identifier and the original MAC address of the user corresponding to the user identifier. The processing module is further configured to determine, based on the user identifier in the specific local MAC address of the first endpoint device, the original MAC address of the user corresponding to the first endpoint device.

In a possible design, when the original MAC address corresponding to the first endpoint device is the original MAC address of the user corresponding to the first endpoint device, the transceiver module is further configured to obtain a sixth correspondence, where the sixth correspondence includes the port identifier and the user identifier, and the original MAC address of the user corresponding to the port identifier and the user identifier. The processing module is further configured to determine, based on the port identifier and the user identifier that correspond to the specific local MAC address of the first endpoint device, the original MAC address of the user corresponding to the first endpoint device.

In a possible design, when the original MAC address corresponding to the first endpoint device is the original MAC address of the user corresponding to the first endpoint device, a destination IP address of the ARP reply packet is the IP address of the user corresponding to the first endpoint device. When the processing module stores the IP address of the user and the original MAC address corresponding to the IP address, the processing module is further configured to determine, based on the destination IP address in the ARP reply packet, the original MAC address of the user corresponding to the first endpoint device.

It should be noted that, in any one of the second aspect or the possible designs in the second aspect, for a specific implementation of the first network device, refer to a behavior function of the first network device in the communication method provided in any one of the first aspect or the possible designs in the first aspect. For a technical effect brought by the first network device, refer to a technical effect brought by any one of the possible designs in the first aspect. Details are not described.

According to a third aspect, an embodiment of this disclosure provides a first network device. The first network device may be a first network device, or a chip or a system on chip in the first network device. The first network device may implement functions performed by the first network device in the foregoing aspects or the possible designs. The functions may be implemented by hardware. In a possible design, the first network device may include a transceiver and a processor. The transceiver and the processor may be configured to support the first network device in implementing the functions in any one of the first aspect or the possible designs in the first aspect. For example, the transceiver may be configured to receive a service packet from a first endpoint device, where a destination MAC address of the service packet is a specific local MAC address of a second endpoint device, the specific local MAC address includes an indication prefix and location information, the indication prefix indicates that the specific local MAC address includes the location information, and the location information indicates an access location of an endpoint device in a network. The processor may be configured to determine an egress port from a preset routing table based on the location information in the specific local MAC address of the second endpoint device. The transceiver may be further configured to send the service packet through the egress port, where the routing table includes the location information and the egress port corresponding to the location information. In another possible design, the first network device may further include a memory. The memory is configured to store computer-executable instructions and data that are necessary for the first network device. When the first network device runs, the transceiver and the processor execute the computer-executable instructions stored in the memory, so that the first network device performs the unified access control parameter configuration method in any one of the first aspect or the possible designs in the first aspect.

For a specific implementation of the first network device in the third aspect, refer to a behavior function of the first network device in the communication method provided in any one of the first aspect or the possible designs in the first aspect.

According to a fourth aspect, an embodiment of this disclosure provides a communication method. The method may include the following. A second network device obtains a service packet of a first endpoint device, where a destination MAC address of the service packet is a specific local MAC address of a second endpoint device, the specific local MAC address includes an indication prefix and location information, the indication prefix indicates that the specific local MAC address includes the location information, and the location information indicates an access location of an endpoint device in a network. The second network device determines an egress port based on the specific local MAC address of the second endpoint device. The second network device modifies the specific local MAC address of the second endpoint device in the service packet to an original MAC address corresponding to the second endpoint device. The second network device sends a modified service packet to the second endpoint device through the egress port.

Based on the fourth aspect, the second network device may forward a packet based on the specific local MAC address and a routing table, that is, forward the packet based on a layer 2 network and a layer 3 network. The specific local MAC address including the location information is used, so that the second network device may perform linear table lookup based on a data plane, and forward the packet based on a table lookup result. In comparison with a network interconnection architecture in which the layer 2 network and the layer 3 network are combined for table lookup and forwarding based on an IP address, when performing table lookup and forwarding based on the specific local MAC address, the second network device may not need to perform processing such as modification and replacement on the service packet, so that a packet forwarding delay and forwarding processing complexity are reduced. This overcomes a disadvantage of the network interconnection architecture in which the layer 2 network and the layer 3 network are combined for table lookup and forwarding based on the IP address, and supports large-scale networking deployment. In addition, in comparison with a network architecture in which packet forwarding is performed based on the layer 2 network, a problem of a loop and a decrease in link utilization that are caused when packet forwarding is performed through the layer 2 network can be resolved. In addition, the second network device modifies the specific local MAC address of the second endpoint device to the original MAC address corresponding to the second endpoint device, so that the second endpoint device may obtain, without perceiving the specific local MAC address, the service packet sent by the first endpoint device.

In a possible design, before that a second network device obtains a service packet of a first endpoint device, the method further includes the following. The second network device obtains an ARP request packet, where a source MAC address in an ARP header of the ARP request packet is a specific local MAC address of the first endpoint device, and a destination IP address of the ARP request packet is an IP address corresponding to the second endpoint device. The second network device broadcasts the ARP request packet.

Based on this possible design, the second network device may broadcast the received ARP request packet, so that the second endpoint device obtains the ARP request packet.

In a possible design, the second network device receives an ARP reply packet from the second endpoint device, where a source MAC address of the ARP reply packet is the original MAC address corresponding to the second endpoint device, and a destination MAC address is the specific local MAC address of the first endpoint device. The second network device modifies the original MAC address corresponding to the second endpoint device in an ARP header of the ARP reply packet to the specific local MAC address of the second endpoint device. The second network device sends a modified ARP reply packet based on the specific local MAC address of the first endpoint device.

Based on this possible design, after receiving the ARP reply packet, the second network device may modify the original MAC address corresponding to the second endpoint device in the ARP reply packet to the specific local MAC address of the second endpoint device, so that the first endpoint device learns of the ARP reply packet of the second endpoint device based on the ARP reply packet.

In a possible design, the second network device determines the egress port from a preset routing table based on the location information in the specific local MAC address of the second endpoint device, and sends the service packet through the egress port, where the routing table includes the location information and the egress port corresponding to the location information.

In a possible design, the second network device determines a port corresponding to the specific local MAC address of the second endpoint device as the egress port.

In a possible design, the second network device determines, based on the specific local MAC address of the second endpoint device, the original MAC address corresponding to the second endpoint device. The second network device determines the egress port based on the original MAC address corresponding to the second endpoint device.

Based on the foregoing three possible designs, the second network device may determine the egress port based on the routing table, or may determine the egress port based on the port corresponding to the specific local MAC address of the second endpoint device, or may determine the egress port based on the original MAC address corresponding to the second endpoint device. This provides a plurality of feasible solutions for the second network device to determine the egress port.

It should be noted that, in any one of the fourth aspect or the possible designs in the fourth aspect, for descriptions of the specific local MAC address, refer to descriptions of the specific local MAC address in any one of the first aspect or the possible designs in the first aspect. For descriptions that the second network device determines the specific local MAC address of the second endpoint device, refer to specific descriptions that the first network device determines the specific local MAC address of the first endpoint device in any one of the first aspect or the possible designs in the first aspect. For descriptions that the second network device modifies the original MAC address corresponding to the second endpoint device to the specific local MAC address of the second endpoint device, refer to specific descriptions that the first network device modifies the original MAC address corresponding to the first endpoint device to the specific local MAC address of the first endpoint device in any one of the first aspect or the possible designs in the first aspect. For descriptions that the second network device modifies the specific local MAC address of the second endpoint device to the original MAC address corresponding to the second endpoint device, refer to specific descriptions that the first network device modifies the specific local MAC address of the first endpoint device to the original MAC address corresponding to the first endpoint device in any one of the first aspect or the possible designs in the first aspect. For a technical effect brought by the second network device, refer to a technical effect brought by the first network device in any possible design in the first aspect. Details are not described.

According to a fifth aspect, an embodiment of this disclosure provides a second network device. The second network device may implement functions performed by the second network device in the first aspect or the possible designs in the first aspect. The functions may be implemented by hardware by executing corresponding software. The hardware or the software includes one or more modules corresponding to the functions, for example, a transceiver module and a processing module. The transceiver module is configured to obtain a service packet of a first endpoint device, where a destination MAC address of the service packet is a specific local MAC address of a second endpoint device, the specific local MAC address includes an indication prefix and location information, the indication prefix indicates that the specific local MAC address includes the location information, and the location information indicates an access location of an endpoint device in a network. The processing module is configured to determine an egress port based on the specific local MAC address of the second endpoint device. The processing module is further configured to modify the specific local MAC address of the second endpoint device in the service packet to an original MAC address corresponding to the second endpoint device. The transceiver module is further configured to send a modified service packet to the second endpoint device through the egress port.

In a possible design, before obtaining the service packet of the first endpoint device, the transceiver module is further configured to obtain an ARP request packet, where a source MAC address in an ARP header of the ARP request packet is a specific local MAC address of the first endpoint device, and a destination IP address of the ARP request packet is an IP address corresponding to the second endpoint device. The transceiver module is further configured to broadcast the ARP request packet.

In a possible design, the transceiver module is further configured to receive an ARP reply packet from the second endpoint device, where a source MAC address of the ARP reply packet is the original MAC address corresponding to the second endpoint device, and a destination MAC address is the specific local MAC address of the first endpoint device. The processing module is further configured to modify the original MAC address corresponding to the second endpoint device in an ARP header of the ARP reply packet to the specific local MAC address of the second endpoint device. The transceiver module is further configured to send a modified ARP reply packet based on the specific local MAC address of the first endpoint device.

In a possible design, the processing module is further configured to determine the egress port from a preset routing table based on the location information in the specific local MAC address of the second endpoint device. The transceiver module is further configured to send the service packet through the egress port, where the routing table includes the location information and the egress port corresponding to the location information.

In a possible design, the processing module is further configured to determine a port corresponding to the specific local MAC address of the second endpoint device as the egress port.

In a possible design, the processing module is further configured to determine, based on the specific local MAC address of the second endpoint device, the original MAC address corresponding to the second endpoint device, and determine the egress port based on the original MAC address corresponding to the second endpoint device.

It should be noted that, in any one of the fifth aspect or the possible designs in the fifth aspect, for a specific implementation of the second network device, refer to a behavior function of the second network device in the communication method provided in any one of the fourth aspect or the possible designs in the fourth aspect. For a technical effect brought by the second network device, refer to a technical effect brought in any one of the possible designs in the fourth aspect. Details are not described.

According to a sixth aspect, an embodiment of this disclosure provides a second network device. The second network device may be a second network device, or a chip or a system on chip in the second network device. The second network device may implement functions performed by the second network device in the foregoing aspects or the possible designs. The functions may be implemented by hardware. In a possible design, the second network device may include a transceiver and a processor. The transceiver and the processor may be configured to support the second network device in implementing the functions in any one of the fourth aspect or the possible designs in the fourth aspect. For example, the transceiver may be configured to obtain a service packet of a first endpoint device, where a destination MAC address of the service packet is a specific local MAC address of a second endpoint device, the specific local MAC address includes an indication prefix and location information, the indication prefix indicates that the specific local MAC address includes the location information, and the location information indicates an access location of an endpoint device in a network. The processor may be configured to determine an egress port based on the specific local MAC address of the second endpoint device. The processor may be further configured to modify the specific local MAC address of the second endpoint device in the service packet to an original MAC address corresponding to the second endpoint device. The transceiver may be further configured to send a modified service packet to the second endpoint device through the egress port. In another possible design, the second network device may further include a memory. The memory is configured to store computer-executable instructions and data that are necessary for the second network device. When the second network device runs, the transceiver and the processor execute the computer-executable instructions stored in the memory, so that the second network device performs the unified access control parameter configuration method in any one of the fourth aspect or the possible designs in the fourth aspect.

For a specific implementation of the second network device in the sixth aspect, refer to a behavior function of the second network device in the communication method provided in any one of the fourth aspect or the possible designs in the fourth aspect.

According to a seventh aspect, an embodiment of this disclosure provides a communication method. The method may include the following. A first endpoint device obtains a specific local MAC address of the first endpoint device, where the specific local MAC address includes an indication prefix and location information, the indication prefix indicates that the specific local MAC address includes the location information, and the location information indicates an access location of an endpoint device in a network. The first endpoint device obtains a specific local MAC address of a second endpoint device. The first endpoint device sends a service packet to a first network device, where a source MAC address of the service packet is the specific local MAC address of the first endpoint device, and a destination MAC address of the service packet is the specific local MAC address of the second endpoint device.

Based on the seventh aspect, on a basis of perceiving the specific local MAC address, the first endpoint device may send the service packet carrying the specific local MAC address of the first endpoint device and the specific local MAC address of the second endpoint device to the first network device, so that the first network device may forward a packet based on the specific local MAC address and a routing table, that is, forward the packet based on a layer 2 network and a layer 3 network. In this embodiment of this disclosure, the specific local MAC address including the location information is used, so that the first network device may perform linear table lookup based on a data plane, and forward the packet based on a table lookup result. In comparison with a network interconnection architecture in which the layer 2 network and the layer 3 network are combined for table lookup and forwarding based on an IP address, when performing table lookup and forwarding based on the specific local MAC address, the first network device may not need to perform processing such as modification and replacement on the service packet, so that a packet forwarding delay and forwarding processing complexity are reduced. This overcomes a disadvantage of the network interconnection architecture in which the layer 2 network and the layer 3 network are combined for table lookup and forwarding based on the IP address, and supports large-scale networking deployment. In addition, in comparison with a network architecture in which packet forwarding is performed based on the layer 2 network, a problem of a loop and a decrease in link utilization that are caused when packet forwarding is performed through the layer 2 network can be resolved.

In a possible design, the first endpoint device receives an original MAC address that corresponds to the endpoint device and that is from the first network device and a specific local MAC address corresponding to the original MAC address, where the endpoint device includes the first endpoint device. The first endpoint device determines the specific local MAC address of the first endpoint device based on the original MAC address corresponding to the first endpoint device.

Based on this possible design, the first endpoint device may determine the specific local MAC address of the first endpoint device based on the original MAC address that corresponds to the endpoint device and that is sent by the first network device and the specific local MAC address corresponding to the original MAC address. This provides a feasible solution for the first endpoint device to determine the specific local MAC address of the first endpoint device.

In a possible design, the first endpoint device broadcasts an ARP request packet, where a source MAC address in an ARP header of the ARP request packet is the specific local MAC address of the first endpoint device, and a destination IP address of the ARP request packet is an IP address corresponding to the second endpoint device. The first endpoint device receives an ARP reply packet from the first network device, where a destination MAC address of the ARP reply packet is the specific local MAC address of the first endpoint device, and a source MAC address in an ARP header of the ARP reply packet is the specific local MAC address of the second endpoint device.

Based on this possible design, the first endpoint device may learn of the specific local MAC address of the second endpoint device by using the ARP packet. This provides a feasible solution for the first endpoint device to learn of the specific local MAC address of the second endpoint device.

It should be noted that, in any one of the seventh aspect or the possible designs in the seventh aspect, for descriptions of the specific local MAC address, refer to descriptions of the specific local MAC address in any one of the first aspect or the possible designs in the first aspect. Details are not described.

According to an eighth aspect, an embodiment of this disclosure provides a first endpoint device. The first endpoint device may implement functions performed by the first endpoint device in the first aspect or the possible designs in the first aspect. The functions may be implemented by hardware by executing corresponding software. The hardware or the software includes one or more modules corresponding to the functions, for example, a processing module and a transceiver module. The processing module is configured to obtain a specific local MAC address of the first endpoint device, where the specific local MAC address includes an indication prefix and location information, the indication prefix indicates that the specific local MAC address includes the location information, and the location information indicates an access location of an endpoint device in a network. The processing module is further configured to obtain a specific local MAC address of a second endpoint device. The transceiver module is configured to send a service packet to a first network device, where a source MAC address of the service packet is the specific local MAC address of the first endpoint device, and a destination MAC address of the service packet is the specific local MAC address of the second endpoint device.

In a possible design, the transceiver module is further configured to receive an original MAC address that corresponds to the endpoint device and that is from the first network device and a specific local MAC address corresponding to the original MAC address, where the endpoint device includes the first endpoint device. The processing module is further configured to determine the specific local MAC address of the first endpoint device based on the original MAC address corresponding to the first endpoint device.

In a possible design, the transceiver module is further configured to broadcast an ARP request packet, where a source MAC address in an ARP header of the ARP request packet is the specific local MAC address of the first endpoint device, and a destination IP address of the ARP request packet is an IP address corresponding to the second endpoint device. The transceiver module is further configured to receive an ARP reply packet from the first network device, where a destination MAC address of the ARP reply packet is the specific local MAC address of the first endpoint device, and a source MAC address in an ARP header of the ARP reply packet is the specific local MAC address of the second endpoint device.

It should be noted that, in any one of the eighth aspect or the possible designs in the eighth aspect, for a specific implementation of the first endpoint device, refer to a behavior function of the first endpoint device in the communication method provided in any one of the seventh aspect or the possible designs in the seventh aspect. For a technical effect brought by the first endpoint device, refer to a technical effect brought in any one of the possible designs in the seventh aspect. Details are not described.

According to a ninth aspect, an embodiment of this disclosure provides a first endpoint device. The first endpoint device may be a first endpoint device, or a chip or a system on chip in the first endpoint device. The first endpoint device may implement functions performed by the first endpoint device in the foregoing aspects or possible designs. The functions may be implemented by hardware. In a possible design, the first endpoint device may include a processor and a transceiver. The processor and the transceiver may be configured to support the first endpoint device in implementing the functions in any one of the seventh aspect or the possible designs in the seventh aspect. For example, the processor may be configured to obtain a specific local MAC address of the first endpoint device, where the specific local MAC address includes an indication prefix and location information, the indication prefix indicates that the specific local MAC address includes the location information, and the location information indicates an access location of an endpoint device in a network. The processor module may be further configured to obtain a specific local MAC address of a second endpoint device. The transceiver may be configured to send a service packet to a first network device, where a source MAC address of the service packet is the specific local MAC address of the first endpoint device, and a destination MAC address of the service packet is the specific local MAC address of the second endpoint device. In another possible design, the first endpoint device may further include a memory. The memory is configured to store computer-executable instructions and data that are necessary for the first endpoint device. When the first endpoint device runs, the transceiver and the processor execute the computer-executable instructions stored in the memory, so that the first endpoint device performs the unified access control parameter configuration method in any one of the seventh aspect or the possible designs in the seventh aspect.

For a specific implementation of the first endpoint device in the ninth aspect, refer to a behavior function of the first endpoint device in the communication method provided in any one of the seventh aspect or the possible designs in the seventh aspect.

According to a tenth aspect, an embodiment of this disclosure provides a communication method. The method may include the following. A first network device receives a service packet from a first endpoint device, where a source MAC address of the service packet is a specific local MAC address of the first endpoint device, a destination MAC address of the service packet is a specific local MAC address of a second endpoint device, the specific local MAC address includes an indication prefix and location information, the indication prefix indicates that the specific local MAC address includes the location information, and the location information indicates an access location of an endpoint device in a network. The first network device determines an egress port from a preset routing table based on the location information in the specific local MAC address of the second endpoint device, where the routing table includes the location information and the egress port corresponding to the location information. The first network device sends the service packet through the egress port.

Based on the tenth aspect, the first network device may forward a packet based on the specific local MAC address and the routing table, that is, forward the packet based on a layer 2 network and a layer 3 network. The specific local MAC address including the location information is used, so that the first network device may perform linear table lookup based on a data plane, and forward the packet based on a table lookup result. In comparison with a network interconnection architecture in which the layer 2 network and the layer 3 network are combined for table lookup and forwarding based on an IP address, when performing table lookup and forwarding based on the specific local MAC address, the first network device may not need to perform processing such as modification and replacement on the service packet, so that a packet forwarding delay and forwarding processing complexity are reduced. This overcomes a disadvantage of the network interconnection architecture in which the layer 2 network and the layer 3 network are combined for table lookup and forwarding based on the IP address, and supports large-scale networking deployment. In addition, in comparison with a network architecture in which packet forwarding is performed based on the layer 2 network, a problem of a loop and a decrease in link utilization that are caused when packet forwarding is performed through the layer 2 network can be resolved.

In a possible design, the first network device obtains an original MAC address corresponding to the endpoint device and a specific local MAC address corresponding to the original MAC address, where the endpoint device includes the first endpoint device. The first network device sends, to the first endpoint device, the original MAC address corresponding to the endpoint device and the specific local MAC address corresponding to the original MAC address.

Based on this possible design, the first network device may send, to the first endpoint device, the obtained original MAC address corresponding to the endpoint device and the specific local MAC address corresponding to the original MAC address, so that the first endpoint device perceives and determines the specific local MAC address of the first endpoint device.

Based on the foregoing two possible designs, the original MAC address corresponding to the first endpoint device may be the original MAC address of the first endpoint device, or may be the original MAC address of the user corresponding to the first endpoint device, so that the communication method provided in this disclosure is applicable to a single-user scenario, or is applicable to a multi-user scenario. This is not limited.

In a possible design, the first network device receives an ARP request packet from the first endpoint device, where a source MAC address in an ARP header of the ARP request packet is the specific local MAC address of the first endpoint device, and a destination IP address of the ARP request packet is an IP address corresponding to the second endpoint device. The first network device sends the ARP request packet to a first control device. The first network device receives an ARP reply packet from the first control device, where a destination MAC address of the ARP reply packet is the specific local MAC address of the first endpoint device, and a source MAC address in an ARP header of the ARP reply packet is the specific local MAC address of the second endpoint device. The first network device sends the ARP reply packet to the first endpoint device.

Based on this possible design, the first network device may further send the ARP request packet of the first endpoint device to the first control device, to obtain the specific local MAC address of the second endpoint device. This provides a feasible solution for the first endpoint device to learn of the specific local MAC address of the second endpoint device.

It should be noted that, in any one of the tenth aspect or the possible designs in the tenth aspect, for descriptions of the specific local MAC address, refer to descriptions of the specific local MAC address in any one of the first aspect or the possible designs in the first aspect. For descriptions that the first network device determines the specific local MAC address of the first endpoint device, refer to specific descriptions that the first network device determines the specific local MAC address of the first endpoint device in any one of the first aspect or the possible designs in the first aspect. Details are not described.

According to an eleventh aspect, an embodiment of this disclosure provides a first network device. The first network device may implement functions performed by the first network device in the tenth aspect or the possible designs in the tenth aspect. The functions may be implemented by hardware by executing corresponding software. The hardware or the software includes one or more modules corresponding to the functions, for example, a transceiver module and a processing module. The transceiver module is configured to receive a service packet from a first endpoint device, where a source MAC address of the service packet is a specific local MAC address of the first endpoint device, a destination MAC address of the service packet is a specific local MAC address of a second endpoint device, the specific local MAC address includes an indication prefix and location information, the indication prefix indicates that the specific local MAC address includes the location information, and the location information indicates an access location of an endpoint device in a network. The processing module is configured to determine an egress port from a preset routing table based on the location information in the specific local MAC address of the second endpoint device, where the routing table includes the location information and the egress port corresponding to the location information. The transceiver module is further configured to send the service packet through the egress port.

In a possible design, the transceiver module is further configured to obtain an original MAC address corresponding to the endpoint device and a specific local MAC address corresponding to the original MAC address, where the endpoint device includes the first endpoint device. The transceiver module is further configured to send, to the first endpoint device, the original MAC address corresponding to the endpoint device and the specific local MAC address corresponding to the original MAC address.

In a possible design, the processing module is further configured to determine, based on the first network device accessed by the endpoint device, a device identifier corresponding to the endpoint device. The processing module is further configured to determine, based on a port through which the endpoint device accesses the first network device, a port identifier corresponding to the endpoint device. The processing module is further configured to determine location information of the endpoint device based on the device identifier corresponding to the endpoint device and the port identifier corresponding to the endpoint device. The processing module is further configured to determine, based on the location information of the endpoint device, the specific local MAC address corresponding to the original MAC address of the endpoint device.

In a possible design, the transceiver module is further configured to receive an ARP request packet from the first endpoint device, where a source MAC address in an ARP header of the ARP request packet is the specific local MAC address of the first endpoint device, and a destination IP address of the ARP request packet is an IP address corresponding to the second endpoint device. The transceiver module is further configured to send the ARP request packet to a first control device. The transceiver module is further configured to receive an ARP reply packet from the first control device, where a destination MAC address of the ARP reply packet is the specific local MAC address of the first endpoint device, and a source MAC address in an ARP header of the ARP reply packet is the specific local MAC address of the second endpoint device. The transceiver module is further configured to send the ARP reply packet to the first endpoint device.

It should be noted that, in any one of the eleventh aspect or the possible designs in the eleventh aspect, for a specific implementation of the first network device, refer to a behavior function of the first network device in the communication method provided in any one of the tenth aspect or the possible designs in the tenth aspect. For a technical effect brought by the first network device, refer to a technical effect brought by any one of the possible designs in the tenth aspect. Details are not described.

According to a twelfth aspect, an embodiment of this disclosure provides a first network device. The first network device may be a first network device, or a chip or a system on chip in the first network device. The first network device may implement functions performed by the first network device in the foregoing aspects or the possible designs. The functions may be implemented by hardware. In a possible design, the first network device may include a transceiver and a processor. The transceiver may be configured to receive a service packet from a first endpoint device, where a source MAC address of the service packet is a specific local MAC address of the first endpoint device, a destination MAC address of the service packet is a specific local MAC address of a second endpoint device, the specific local MAC address includes an indication prefix and location information, the indication prefix indicates that the specific local MAC address includes the location information, and the location information indicates an access location of an endpoint device in a network. The processor may be configured to determine an egress port from a preset routing table based on the location information in the specific local MAC address of the second endpoint device, where the routing table includes the location information and the egress port corresponding to the location information. The transceiver may be further configured to send the service packet through the egress port. In another possible design, the first network device may further include a memory. The memory is configured to store computer-executable instructions and data that are necessary for the first network device. When the first network device runs, the transceiver and the processor execute the computer-executable instructions stored in the memory, so that the first network device performs the unified access control parameter configuration method in any one of the tenth aspect or the possible designs in the tenth aspect.

For a specific implementation of the first network device in the twelfth aspect, refer to a behavior function of the first network device in the communication method provided in any one of the tenth aspect or the possible designs in the tenth aspect.

According to a thirteenth aspect, an embodiment of this disclosure provides a communication method. The method may include the following. A first control device receives a first ARP request packet from a first network device, where a destination IP address of the ARP request packet is an IP address corresponding to a second endpoint device. The first control device obtains a first ARP reply packet based on the first ARP request packet, where a source MAC address in an ARP header of the first ARP reply packet is a specific local MAC address of the second endpoint device, the specific local MAC address includes an indication prefix and location information, the indication prefix indicates that the specific local MAC address includes the location information, and the location information indicates an access location of an endpoint device in a network. The first control device sends the first ARP reply packet to the first network device.

Based on the thirteenth aspect, a specific local MAC address learning procedure is completed by combining a control plane and a forwarding plane, so that a disadvantage (for example, a broadcast storm and a traffic self-loop) of conventional broadcast processing on the forwarding plane can be reduced through optimization and processing of the control plane.

In a possible design, the first control device determines, based on a locally stored IP address and a specific local MAC address corresponding to the IP address, whether the IP address corresponding to the second endpoint device is included. If the IP address corresponding to the second endpoint device is included, the first control device determines the first ARP reply packet based on the specific local MAC address corresponding to the IP address corresponding to the second endpoint device. If the IP address corresponding to the second endpoint device is not included, the first control device broadcasts the first ARP request packet, and obtains the first ARP reply packet.

Based on this possible design, the first control device may determine the specific local MAC address of the second endpoint device based on the locally stored IP address and the specific local MAC address corresponding to the IP address, or may obtain the specific local MAC address of the second endpoint device in a broadcast manner. This is not limited.

In a possible design, the first control device receives, from a second control device, an IP address and a specific local MAC address corresponding to the IP address. The first control device locally stores the IP address and the specific local MAC address corresponding to the IP address.

Based on this possible design, the first control device may also synchronize, with the second control device, the IP address and the specific local MAC address corresponding to the IP address.

In a possible design, the first control device receives a second ARP request packet from the first network device, where a destination IP address of the second ARP request packet is an IP address corresponding to a first endpoint device. The first control device obtains a second ARP reply packet based on the second ARP request packet, where a source MAC address in an ARP header of the second ARP reply packet is a specific local MAC address of the first endpoint device.

In a possible design, the first control device sends, to the second control device based on the second ARP request packet, the locally stored IP address and the specific local MAC address corresponding to the IP address.

Based on the foregoing two possible designs, when receiving the second ARP request packet, the first control device may trigger synchronization with the IP address of the second control device and the specific local MAC address corresponding to the IP address.

In a possible design, the first control device obtains an original MAC address corresponding to the endpoint device. The first control device determines, based on the original MAC address corresponding to the endpoint device, a specific local MAC address corresponding to the original MAC address. The first control device sends, to the first network device, the original MAC address corresponding to the endpoint device and the specific local MAC address corresponding to the original MAC address.

Based on this possible design, the first control device may also generate the specific local MAC address corresponding to the original MAC address, and send the specific local MAC address to the first network device, so that the first network device determines a specific local MAC address corresponding to each original MAC address.

It should be noted that, in any one of the thirteenth aspect or the possible designs in the thirteenth aspect, for descriptions of the specific local MAC address, refer to descriptions of the specific local MAC address in any one of the first aspect or the possible designs in the first aspect. For descriptions that the first control device determines the specific local MAC address of the endpoint device, refer to specific descriptions that the first network device determines the specific local MAC address of the first endpoint device in any one of the first aspect or the possible designs in the first aspect. Details are not described.

According to a fourteenth aspect, an embodiment of this disclosure provides a first control device. The first control device may implement functions performed by the first control device in the thirteenth aspect or the possible designs in the thirteenth aspect. The functions may be implemented by hardware by executing corresponding software. The hardware or the software includes one or more modules corresponding to the functions, for example, a transceiver module and a processing module. The transceiver module is configured to receive a first ARP request packet from a first network device, where a destination IP address of the ARP request packet is an IP address corresponding to a second endpoint device. The processing module is configured to obtain a first ARP reply packet based on the first ARP request packet, where a source MAC address in an ARP header of the first ARP reply packet is a specific local MAC address of the second endpoint device, the specific local MAC address includes an indication prefix and location information, the indication prefix indicates that the specific local MAC address includes the location information, and the location information indicates an access location of an endpoint device in a network. The transceiver module is further configured to send the first ARP reply packet to the first network device.

In a possible design, the processing module is configured to determine, based on a locally stored IP address and a specific local MAC address corresponding to the IP address, whether the IP address corresponding to the second endpoint device is included. If the IP address corresponding to the second endpoint device is included, the processing module determines the first ARP reply packet based on the specific local MAC address corresponding to the IP address corresponding to the second endpoint device. If the IP address corresponding to the second endpoint device is not included, the transceiver module broadcasts the first ARP request packet, and obtains the first ARP reply packet.

In a possible design, the transceiver module is further configured to receive, from a second control device, an IP address and a specific local MAC address corresponding to the IP address. The processing module is further configured to locally store the IP address and the specific local MAC address corresponding to the IP address.

In a possible design, the transceiver module is further configured to receive a second ARP request packet from the first network device, where a destination IP address of the second ARP request packet is an IP address corresponding to a first endpoint device. The processing module is further configured to obtain a second ARP reply packet based on the second ARP request packet, where a source MAC address in an ARP header of the second ARP reply packet is a specific local MAC address of the first endpoint device.

In a possible design, the transceiver module is further configured to send, to the second control device based on the second ARP request packet, the locally stored IP address and the specific local MAC address corresponding to the IP address.

In a possible design, the transceiver module is further configured to obtain an original MAC address corresponding to the endpoint device. The processing module is further configured to determine, based on the original MAC address corresponding to the endpoint device, a specific local MAC address corresponding to the original MAC address. The transceiver module is further configured to send, to the first network device, the original MAC address corresponding to the endpoint device and the specific local MAC address corresponding to the original MAC address.

It should be noted that, in any one of the fourteenth aspect or the possible designs in the fourteenth aspect, for a specific implementation of the first control device, refer to a behavior function of the first control device in the communication method provided in any one of the thirteenth aspect or the possible designs in the thirteenth aspect. For a technical effect brought by the first control device, refer to a technical effect brought by any one of the possible designs in the thirteenth aspect. Details are not described.

According to a fifteenth aspect, an embodiment of this disclosure provides a first control device. The first control device may be a first control device, or a chip or a system on chip in the first control device. The first control device may implement functions performed by the first control device in the foregoing aspects or the possible designs. The functions may be implemented by hardware. In a possible design, the first control device may include a transceiver and a processor. The transceiver and the processor may be configured to support the first control device in implementing the functions in any one of the thirteenth aspect or the possible designs in the thirteenth aspect. For example, the transceiver may be configured to receive a first ARP request packet from a first network device, where a destination IP address of the ARP request packet is an IP address corresponding to a second endpoint device. The processor may be configured to obtain a first ARP reply packet based on the first ARP request packet, where a source MAC address in an ARP header of the first ARP reply packet is a specific local MAC address of the second endpoint device, the specific local MAC address includes an indication prefix and location information, the indication prefix indicates that the specific local MAC address includes the location information, and the location information indicates an access location of an endpoint device in a network. The transceiver may be further configured to send the first ARP reply packet to the first network device. In another possible design, the first control device may further include a memory. The memory is configured to store computer-executable instructions and data that are necessary for the first control device. When the first control device runs, the transceiver and the processor execute the computer-executable instructions stored in the memory, so that the first control device performs the unified access control parameter configuration method in any one of the thirteenth aspect or the possible designs in the thirteenth aspect.

For a specific implementation of the first control device in the fifteenth aspect, refer to a behavior function of the first control device in the communication method provided in any one of the thirteenth aspect or the possible designs in the thirteenth aspect.

According to a sixteenth aspect, a communication apparatus is provided. The communication apparatus includes one or more processors. The one or more processors are configured to run a computer program or instructions. When the one or more processors execute the computer instructions or instructions, the communication apparatus is enabled to perform the communication method in any one of the first aspect or the possible designs in the first aspect, or perform the communication method in any one of the fourth aspect or the possible designs in the fourth aspect, or perform the communication method in any one of the seventh aspect or the possible designs in the seventh aspect, or perform the communication method in any one of the tenth aspect or the possible designs in the tenth aspect, or perform the communication method in any one of the thirteenth aspect or the possible designs in the thirteenth aspect.

In a possible design, the communication apparatus further includes one or more communication interfaces. The one or more communication interfaces are coupled to the one or more processors. The one or more communication interfaces are configured to communicate with a module other than the communication apparatus.

In a possible design, the communication apparatus further includes one or more memories. The one or more memories are coupled to the one or more processors. The one or more memories are configured to store the foregoing computer program or instructions. In a possible implementation, the memory is located outside the communication apparatus. In another possible implementation, the memory is located inside the communication apparatus. In this embodiment of this disclosure, the processor and the memory may alternatively be integrated into one device. In other words, the processor and the memory may alternatively be integrated together.

According to a seventeenth aspect, a communication apparatus is provided. The communication apparatus includes an interface circuit and a logic circuit. The interface circuit is coupled to the logic circuit. The logic circuit is configured to perform the communication method in any one of the first aspect or the possible designs in the first aspect, or perform the communication method in any one of the fourth aspect or the possible designs in the fourth aspect, or perform the communication method in any one of the seventh aspect or the possible designs in the seventh aspect, or perform the communication method in any one of the tenth aspect or the possible designs in the tenth aspect, or perform the communication method in any one of the thirteenth aspect or the possible designs in the thirteenth aspect. The interface circuit is configured to communicate with a module other than the communication apparatus.

According to an eighteenth aspect, a computer-readable storage medium is provided. The computer-readable storage medium stores computer instructions or a program. When the computer instructions or the program are/is run on a computer, the computer is enabled to perform the communication method in any one of the first aspect or the possible designs in the first aspect, or perform the communication method in any one of the fourth aspect or the possible designs in the fourth aspect, or perform the communication method in any one of the seventh aspect or the possible designs in the seventh aspect, or perform the communication method in any one of the tenth aspect or the possible designs in the tenth aspect, or perform the communication method in any one of the thirteenth aspect or the possible designs in the thirteenth aspect.

According to a nineteenth aspect, a computer program product including computer instructions is provided. When the computer program product runs on a computer, the computer is enabled to perform the communication method in any one of the first aspect or the possible designs in the first aspect, or perform the communication method in any one of the fourth aspect or the possible designs in the fourth aspect, or perform the communication method in any one of the seventh aspect or the possible designs in the seventh aspect, or perform the communication method in any one of the tenth aspect or the possible designs in the tenth aspect, or perform the communication method in any one of the thirteenth aspect or the possible designs in the thirteenth aspect.

According to a twentieth aspect, an embodiment of this disclosure provides a computer program. When the computer program is run on a computer, the computer is enabled to perform the communication method in any one of the first aspect or the possible designs in the first aspect, or perform the communication method in any one of the fourth aspect or the possible designs in the fourth aspect, or perform the communication method in any one of the seventh aspect or the possible designs in the seventh aspect, or perform the communication method in any one of the tenth aspect or the possible designs in the tenth aspect, or perform the communication method in any one of the thirteenth aspect or the possible designs in the thirteenth aspect.

For a technical effect brought by any design in the sixteenth aspect to the twentieth aspect, refer to a technical effect brought by any possible design in the first aspect, or refer to a technical effect brought by any possible design in the fourth aspect, or refer to a technical effect brought by any possible design in the seventh aspect, or refer to a technical effect brought by any possible design in the tenth aspect, or refer to a technical effect brought by any possible design in the thirteenth aspect. Details are not described.

According to a twenty-first aspect, a communication system is provided. The communication system includes the first network device in either of the second aspect and the third aspect, the second network device in either of the fifth aspect and the sixth aspect, and the first control device in either of the fourteenth aspect and the fifteenth aspect, or includes the first endpoint device in either of the seventh aspect and the eighth aspect, the first network device in either of the eleventh aspect and the twelfth aspect, and the first control device in either of the fourteenth aspect and the fifteenth aspect.

BRIEF DESCRIPTION OF DRAWINGS

FIG. 12A and FIG. 12B are schematic diagrams of a frame structure of a specific local MAC address according to an embodiment of this disclosure;

DESCRIPTION OF EMBODIMENTS

Before embodiments of this disclosure are described, technical terms used in embodiments of this disclosure are described.

Resource deconstruction: The resource deconstruction means a new computing architecture driven by a new service and a storage class memory (SCM). A computing unit, a storage unit, and a memory unit may be distributed at different locations in a communication network, and interact with each other through a network connection to complete service processing.

Pipeline: The pipeline is a serial pipeline architecture.

Infiniband (IB): The IB is a computer network communication standard used for high performance computing, and is featured by high throughput and a low delay. The IB may be used for data interconnection between computers, or may be used for direct or switch interconnection between servers and storage systems, and interconnection between storage systems.

Ethernet: The Ethernet is a communication protocol standard used for a local area network. Packet forwarding may be performed through a layer 2 network, or a layer 2 network and a layer 3 network.

Figure 1:
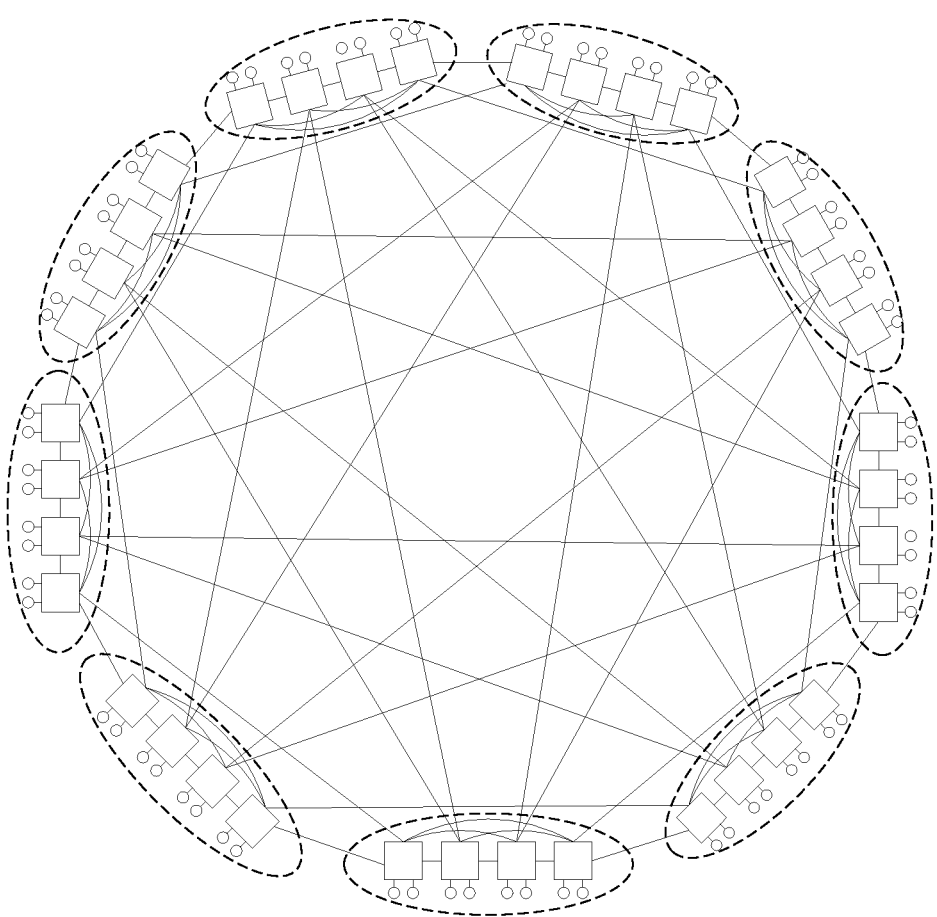
FIG. 1 is a schematic diagram of a high-performance computing/cluster computing scenario according to an embodiment of this disclosure.
Figure 2:
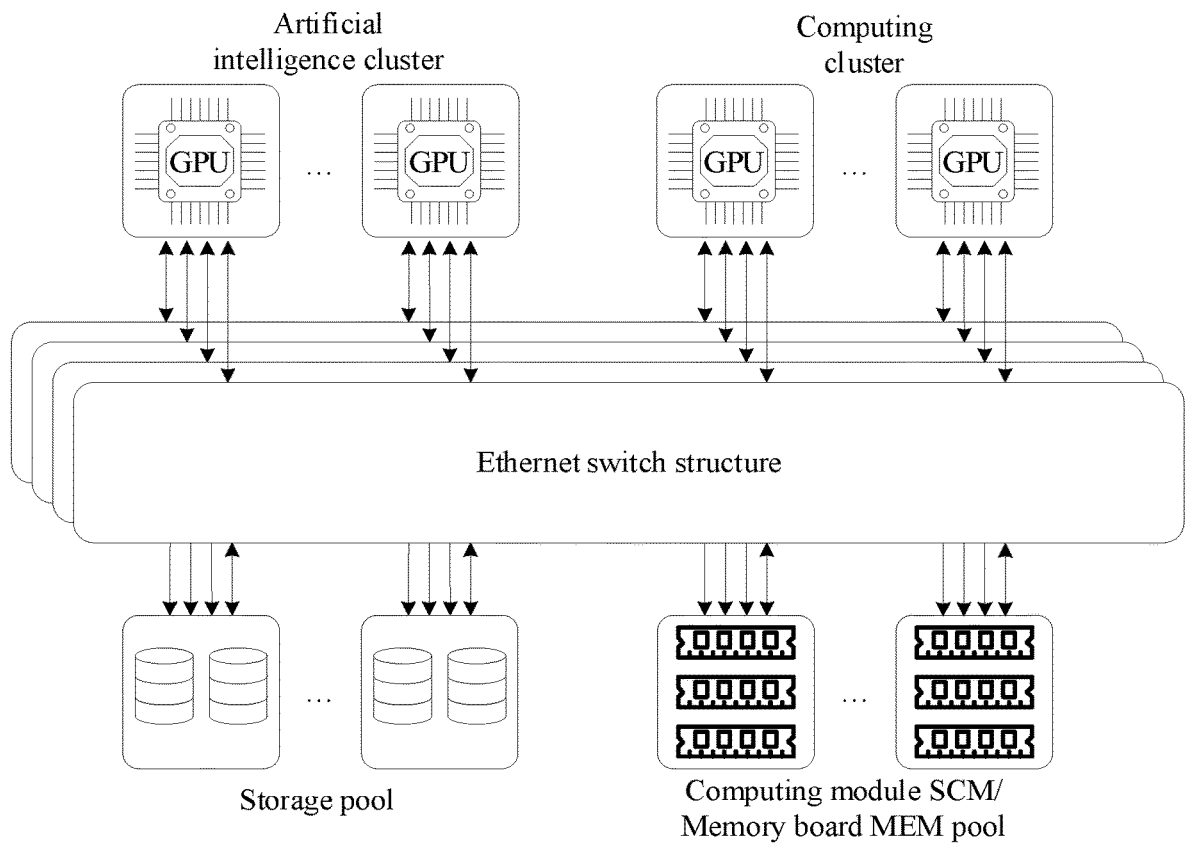
FIG. 2 is a schematic diagram of a high-performance storage scenario according to an embodiment of this disclosure.

In comparison with the Ethernet, the IB has extremely high throughput and an extremely low delay, and therefore is a mainstream in a high-performance computing (HPC)/cluster computing scenario shown in FIG. 1 or a high-performance storage scenario shown in FIG. 2.

For example, refer to the following Table 1. A delay is used as an example. A minimum end-to-end delay of a switch using an Ethernet may be about 300 nanoseconds (ns), and a minimum end-to-end delay of a switch using an IB may be about 90 ns.

TABLE 1

| | Ethernet | | | IB | | |
|---|---|---|---|---|---|---|
| | Spectrum | Spectrum 2 | Tomahawk | Switch-IB | Switch-IB 2 | Quantum |
| Bandwidth | 3.2 T | 6.4 T | 3.2 T | 3.6 T | 3.6 T | 8 T |
| Port | 128*25 G | 128*50 G | 128*25 G | 144*25 G | 144*25 G | 160*50 G |
| Delay | 300 ns | 300 ns | 400 ns | 90 ns | 90 ns | 90 ns |
| Cache | 16 megabytes (MB) | 42 MB | 16 MB | NA | NA | NA |

However, in comparison with the IB, the Ethernet has large ecological and cost advantages. When both computing and storage scenarios have a high requirement on a static delay of a network (where for example, a single-hop forwarding delay of a network device is required to be reduced from about 400 ns to about 100 ns), an Ethernet-based low-delay forwarding technology is required, to reduce a network delay.

Figure 3:
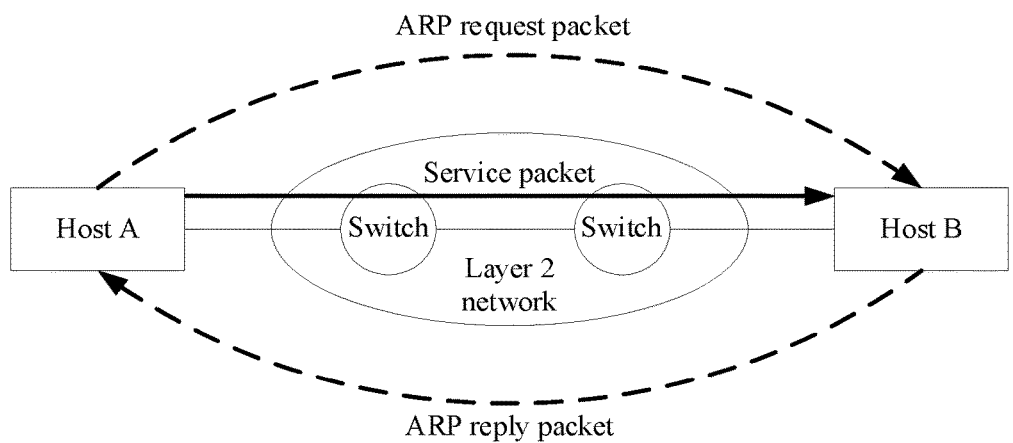
FIG. 3 is a schematic diagram of a layer 2 network architecture in which packet forwarding is performed based on an original MAC address according to an embodiment of this disclosure.
Figure 4:
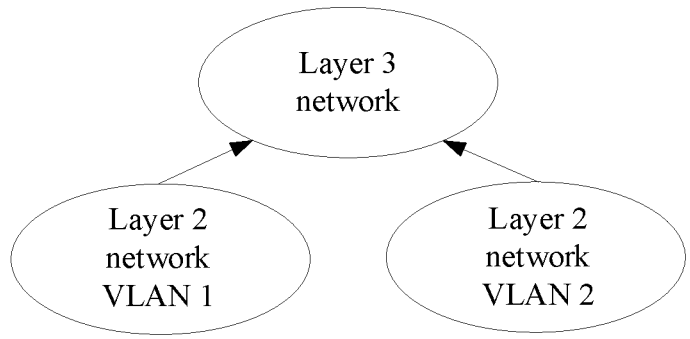
FIG. 4 is a schematic diagram of a network interconnection architecture in which a layer 2 network and a layer 3 network are combined for table lookup and forwarding based on an IP address according to an embodiment of this disclosure.

Furthermore, in the Ethernet, packet forwarding may be performed through a layer 2 network shown in FIG. 3, or may be performed through a layer 2 network and a layer 3 network shown in FIG. 4.

For example, as shown in FIG. 3, that a host A communicates with a host B through a layer 2 network is used as an example. The host A may broadcast an ARP request packet in a broadcast domain, where a source MAC address of the ARP request packet may be a MAC address of the host A, and a destination IP address may be an IP address of the host B. When a network device in the broadcast domain obtains the ARP request packet, the network device may trigger, based on the ARP request packet, the source MAC address to learn a forwarding entry, generate a mapping relationship between a destination MAC address and a port, that is, generate a forwarding table, and then broadcast and flood the ARP request packet, until the host B obtains the ARP request packet. The host B may perform an ARP reply based on the obtained ARP request packet, that is, send an ARP reply packet carrying the MAC address of the host B to the network device, so that the network device generates a mapping relationship between the source MAC address and the port based on the ARP reply packet, and sends the ARP reply packet to the host A in a unicast mode based on the generated forwarding table. The host A may learn of the MAC address of the host B based on the received ARP reply packet. Therefore, when the host A needs to communicate with the host B, the host A may use the MAC address of the host B as a destination MAC address of a service packet, and send the service packet to the host B in a unicast mode through the network device, to implement communication between the host A and the host B.

However, the host A broadcasts the ARP request packet in the broadcast domain. Consequently, the network device in the broadcast domain may generate a broadcast packet in a vicious cycle, causing a loop in the layer 2 network. A problem of the loop in the layer 2 network may be resolved by using a Spanning Tree Protocol (STP) or a Multiple STP (MSTP), but a decrease in link utilization of a communication network is caused. In addition, in the layer 2 network, MAC address aging and learning are complex and need hardware support, which consumes a large quantity of hardware resources.

Based on this, as shown in FIG. 4, a VLAN may be introduced to perform filtering, isolation, and related processing on the broadcast domain, so that the layer 2 network is divided into different broadcast domains, and communication may be established between different broadcast domains through a layer 3 network. When receiving a packet sent by the layer 2 network, the layer 3 network may determine whether a destination MAC address of the packet is a local MAC address, and if the destination MAC address of the packet is the local MAC address, terminate layer 2 network processing, parse an IP address of the packet, and search a routing table based on the IP address for forwarding.

However, when the foregoing communication manner in which the layer 2 network and the layer 3 network are combined is used, division into broadcast domains through the VLAN increases packet processing complexity, and searching of the routing table based on the IP address causes a long packet forwarding delay. In addition, when the packet is forwarded, an uplink and a downlink need to be distinguished, processing is complex, and a layer 2 header of the packet needs to be frequently modified and replaced at each hop. This also increases the packet forwarding delay.

It may be learned from the foregoing that a packet forwarding delay is high regardless of whether packet forwarding is performed based on the layer 2 network or packet forwarding is performed based on the layer 2 network and the layer 3 network. In this way, how to reduce the packet forwarding delay based on the Ethernet becomes an urgent problem to be resolved.

To resolve this problem, embodiments of this disclosure provide a communication method and an apparatus. A first network device may receive a service packet from a first endpoint device, where a destination MAC address of the service packet may be a specific local MAC address of a second endpoint device, the specific local MAC address may include an indication prefix and location information, the indication prefix may indicate that the specific local MAC address includes the location information, and the location information may indicate an access location of an endpoint device in a network. The first network device may determine an egress port from a preset routing table based on the location information in the specific local MAC address of the second endpoint device, and send the service packet through the egress port, where the routing table may include the location information and the egress port corresponding to the location information.

In embodiments of this disclosure, the first network device may forward a packet based on the specific local MAC address and the routing table, that is, forward the packet based on a layer 2 network and a layer 3 network. The specific local MAC address including the location information is used, so that the first network device may perform linear table lookup based on a data plane, and forward the packet based on a table lookup result. In comparison with a network interconnection architecture in which the layer 2 network and the layer 3 network are combined for table lookup and forwarding based on an IP address, when performing table lookup and forwarding based on the specific local MAC address, the first network device may not need to perform processing such as modification and replacement on the service packet, so that a packet forwarding delay and forwarding processing complexity are reduced. This overcomes a disadvantage of the network interconnection architecture in which the layer 2 network and the layer 3 network are combined for table lookup and forwarding based on the IP address, and supports large-scale networking deployment. In addition, in comparison with a network architecture in which packet forwarding is performed based on the layer 2 network, a problem of a loop and a decrease in link utilization that are caused when packet forwarding is performed through the layer 2 network can be resolved.

The following describes implementations of embodiments of this disclosure in detail with reference to accompanying drawings in this specification.

The communication method provided in embodiments of this disclosure may be applied to low-delay network interconnection architectures of different scales, for example, a high-performance computing scenario, a cluster computing scenario, a high performance storage scenario, or a storage memory pooling scenario. This is not limited. The following uses FIG. 5 as an example to describe a low-delay network interconnection architecture according to an embodiment of this disclosure.

Figure 5:
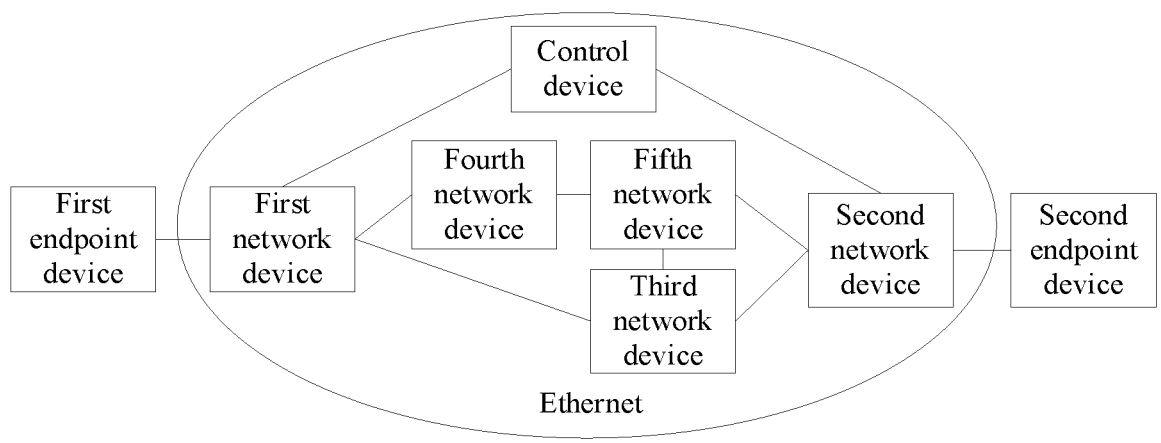
FIG. 5 is a schematic diagram of a low-delay network interconnection architecture according to an embodiment of this disclosure.

FIG. 5 is a schematic diagram of a low-delay network interconnection architecture according to an embodiment of this disclosure. As shown in FIG. 5, the low-delay network interconnection architecture may include an endpoint device and an Ethernet, where the Ethernet may include a network device and a control device.

It should be noted that, in this embodiment of this disclosure, the Ethernet shown in FIG. 5 can effectively reduce a packet forwarding delay and forwarding processing complexity. The Ethernet shown in FIG. 5 may also be described as a simplified Ethernet, a simplified low-delay Ethernet, or the like. This is not limited.

The endpoint device in FIG. 5 may be a device that accesses the Ethernet. For example, the endpoint device may be a device such as a terminal device, a single host server, a multi-virtual machine server, a conventional layer 3 switch, or a gateway. This is not limited. It should be noted that the endpoint device may also be described as an access device.

For example, the terminal device (or terminal) may also be referred to as user equipment (UE), a mobile station (MS), a mobile terminal (MT), or the like. For example, the terminal device may be a mobile phone, a tablet computer, or a computer having a wireless transceiver function. Alternatively, the terminal device may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a wireless terminal in a smart home, a vehicle-mounted terminal, a vehicle having a vehicle-to-vehicle (V2V) communication capability, an intelligent connected vehicle, an uncrewed aerial vehicle (UAV) having a UAV-to-UAV (U2U) communication capability, or the like. This is not limited.

The network device in FIG. 5 may be a device, such as a switch or a router, that can implement routing and forwarding.

Figure 6:
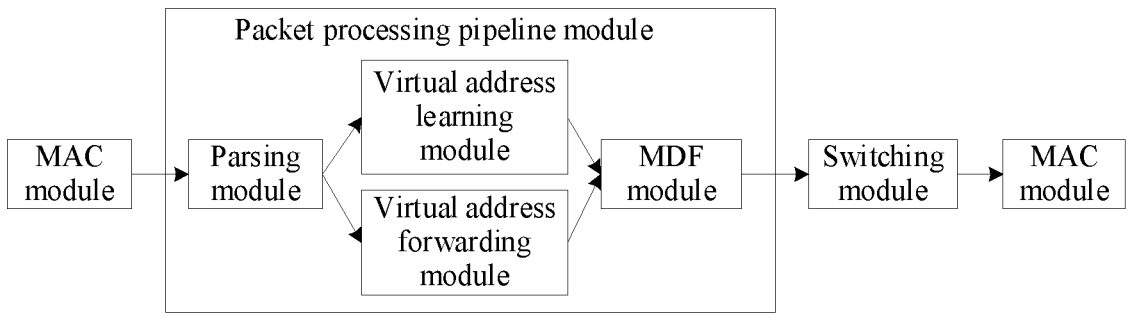
FIG. 6 is a schematic diagram of composition of a network device according to an embodiment of this disclosure.

For example, as shown in FIG. 6, the network device may include a MAC module, a packet processing pipeline module, and a switching module (or switch buffer (SWB)).

Further, the MAC module in FIG. 6 may also be referred to as an interface module, and is configured to be responsible for functions of signal receiving, serial-to-parallel conversion, forward error correction (FEC) detection, and the like.

Further, the packet processing pipeline module in FIG. 6 may include a parsing module, a virtual address learning module, a virtual address forwarding module, and a modification (MDF) module. The parsing module may be configured to parse a packet and obtain a packet field type for subsequent processing. The virtual address learning module may be configured to complete ARP packet modification. The virtual address forwarding module may be configured to complete forwarding of a service packet direct table. The MDF module may be configured to complete packet modification. It should be noted that the virtual address learning module and the virtual address forwarding module are newly added functional modules in embodiments of this disclosure.

Further, the switching module in FIG. 6 may be configured to implement functions of packet switching, queue scheduling, flow control processing, and the like.

The control device in FIG. 5 may be a centralized network management plane or a control plane, and is responsible for functions of network device management, topology discovery, route delivery, and the like. For example, the control device may manage and collect a network topology, dynamically deliver or statically configure a specific local MAC address based on a policy control plane, and calculate and deliver a route.

It should be noted that, in embodiments of this disclosure, the control device may calculate and deliver the route by using a centralized control plane routing algorithm, or may calculate and deliver the route by using a distributed control plane routing algorithm or another routing algorithm. This is not limited.

Figure 7:
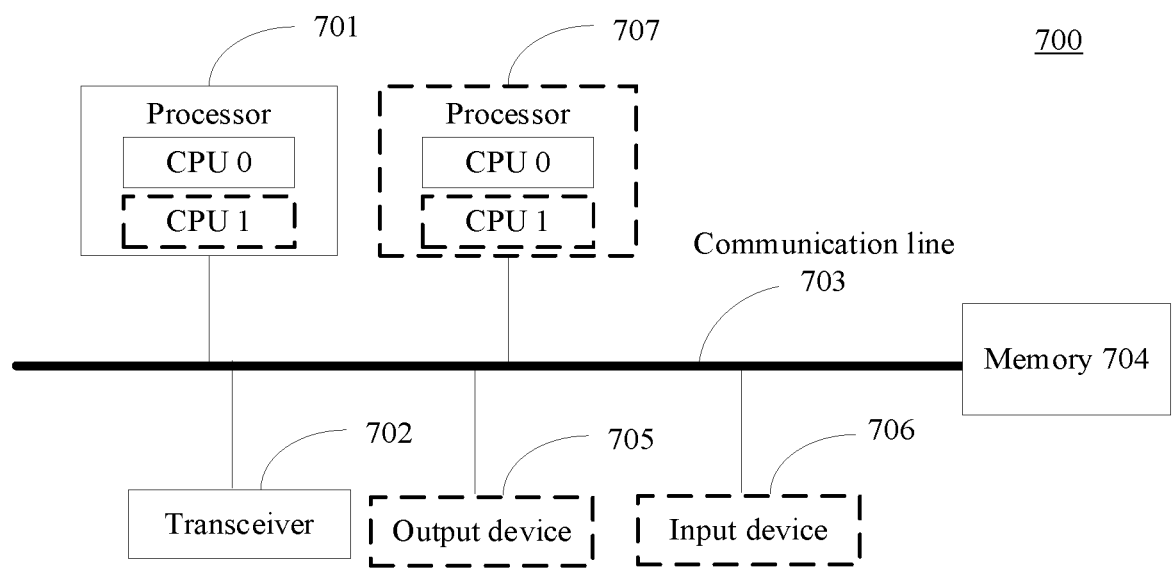
FIG. 7 is a schematic diagram of composition of a communication apparatus according to an embodiment of this disclosure.

During specific implementation, as shown in FIG. 5, for example, the endpoint device, the network device, and the control device may all use a composition structure shown in FIG. 7, or include components shown in FIG. 7. FIG. 7 is a schematic diagram of composition of a communication apparatus 700 according to an embodiment of this disclosure. The communication apparatus 700 may be an endpoint device, or a chip or a system on chip in the endpoint device, or may be a network device, or a chip or a system on chip in the network device, or may be a control device, or a chip or a system on chip in the control device. As shown in FIG. 7, the communication apparatus 700 includes a processor 701, a transceiver 702, and a communication line 703.

Further, the communication apparatus 700 may further include a memory 704. The processor 701, the memory 704, and the transceiver 702 may be connected through the communication line 703.

The processor 701 is a central processing unit (CPU), a general-purpose processor, a network processor (NP), a digital signal processor (DSP), a microprocessor, a microcontroller, a programmable logic device (PLD), or any combination thereof. Alternatively, the processor 701 may be another apparatus having a processing function, for example, a circuit, a device, or a software module. This is not limited.

The transceiver 702 is configured to communicate with another device. The transceiver 702 may be a module, a circuit, a transceiver, or any apparatus that can implement communication.

The communication line 703 is configured to transmit information between components included in the communication apparatus 700.

The memory 704 is configured to store instructions. The instructions may be a computer program.

The memory 704 may be a read-only memory (ROM) or another type of static storage device that can store static information and/or instructions, or may be a random-access memory (RAM) or another type of dynamic storage device that can store information and/or instructions, or may be an electrically erasable programmable ROM (EEPROM), a compact disc (CD) ROM (CD-ROM) or another CD storage, an optical disc storage (including a CD, a laser disc, an optical disc, a DIGITAL VERSATILE DISC (DVD), a BLU-RAY disc, or the like), a magnetic disk storage medium or another magnetic storage device, or the like. This is not limited.

It should be noted that the memory 704 may be independent of the processor 701, or may be integrated with the processor 701. The memory 704 may be configured to store instructions, program code, some data, or the like. The memory 704 may be located inside the communication apparatus 700, or may be located outside the communication apparatus 700. This is not limited. The processor 701 is configured to execute the instructions stored in the memory 704, to implement the communication method provided in the following embodiments of this disclosure.

In an example, the processor 701 may include one or more CPUs, for example, a CPU 0 and a CPU 1 in FIG. 7.

In an optional implementation, the communication apparatus 700 may include a plurality of processors. For example, in addition to the processor 701 in FIG. 7, the communication apparatus 700 may further include a processor 707.

In an optional implementation, the communication apparatus 700 further includes an output device 705 and an input device 706. For example, the input device 706 is a device, such as a keyboard, a mouse, a microphone, or a joystick, and the output device 705 is device, such as a display or a speaker.

It should be noted that the communication apparatus 700 may be a desktop computer, a portable computer, a network server, a mobile phone, a tablet computer, a wireless terminal, an embedded device, a chip system, or a device having a structure similar to that in FIG. 7. In addition, a composition structure shown in FIG. 7 does not constitute a limitation on the communication apparatus. In addition to the components shown in FIG. 7, the communication apparatus may include more or fewer components than those shown in the figure, or some components may be combined, or different component arrangements may be used.

In embodiments of this disclosure, the chip system may include a chip, or may include a chip and another discrete device.

In addition, for actions, terms, and the like in embodiments of this disclosure, refer to each other. This is not limited. In embodiments of this disclosure, names of messages exchanged between devices, names of parameters in the messages, or the like are merely examples. Another name may alternatively be used during specific implementation. This is not limited.

Figure 8:
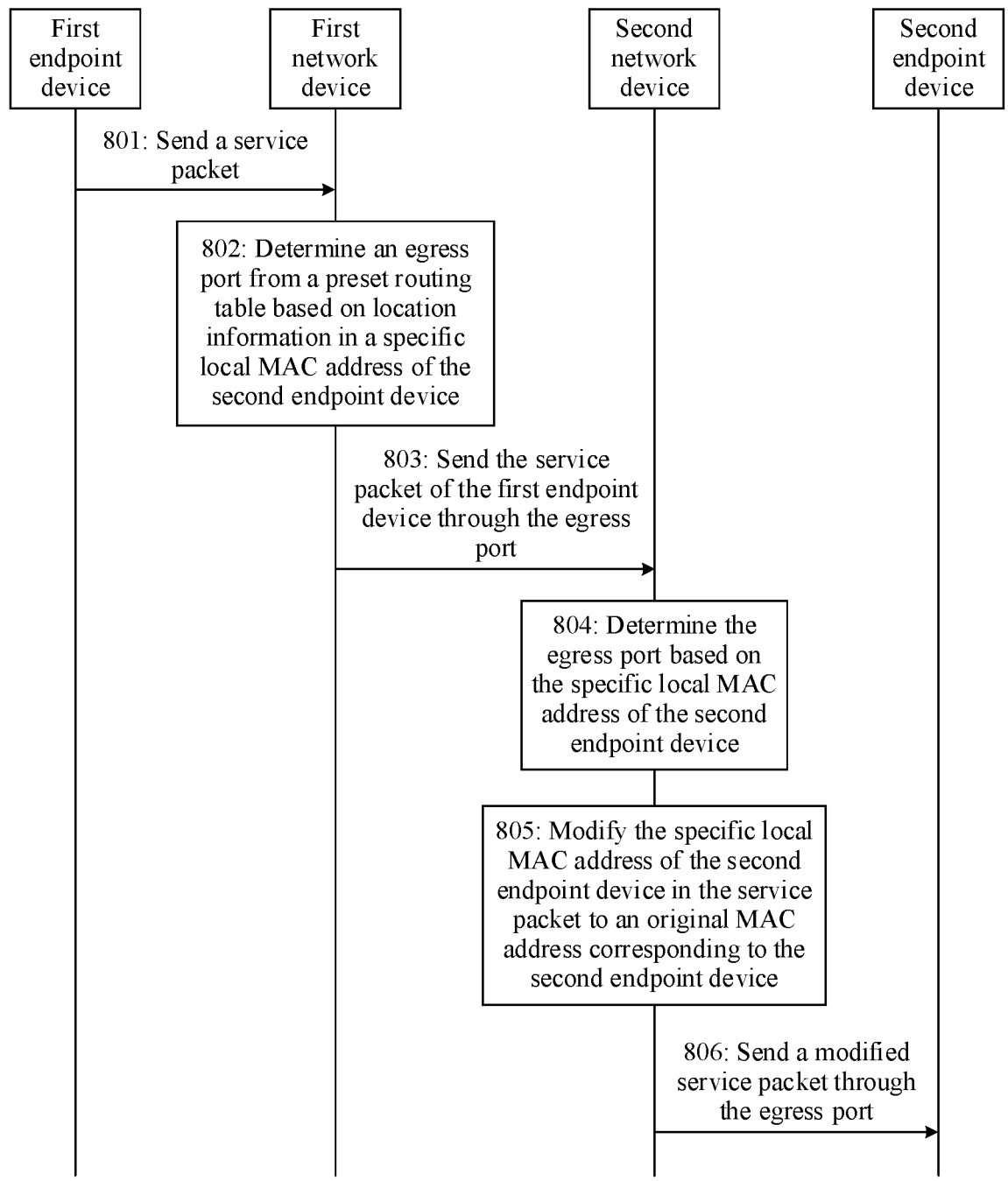
FIG. 8 is a flowchart of a communication method according to an embodiment of this disclosure.

With reference to the low-delay network interconnection architecture shown in FIG. 5, the following describes a communication method provided in embodiments of this disclosure with reference to FIG. 8. A first endpoint device may be any endpoint device in the low-delay network interconnection architecture shown in FIG. 5. A second endpoint device may be any endpoint device other than the first endpoint device in the low-delay network interconnection architecture shown in FIG. 5. A first network device may be any network device connected to the first endpoint device in the low-delay network interconnection architecture shown in FIG. 5. A second network device may be any network device connected to the second endpoint device in the low-delay network interconnection architecture shown in FIG. 5. A control device may be any control device in the low-delay network interconnection architecture shown in FIG. 5. The endpoint device, the network device, and the control device described in the following embodiments may all have the components shown in FIG. 7.

FIG. 8 is a flowchart of a communication method according to an embodiment of this disclosure. As shown in FIG. 8, the method may include the following steps.

Step 801: A first endpoint device sends a service packet to a first network device.

Figure 9:
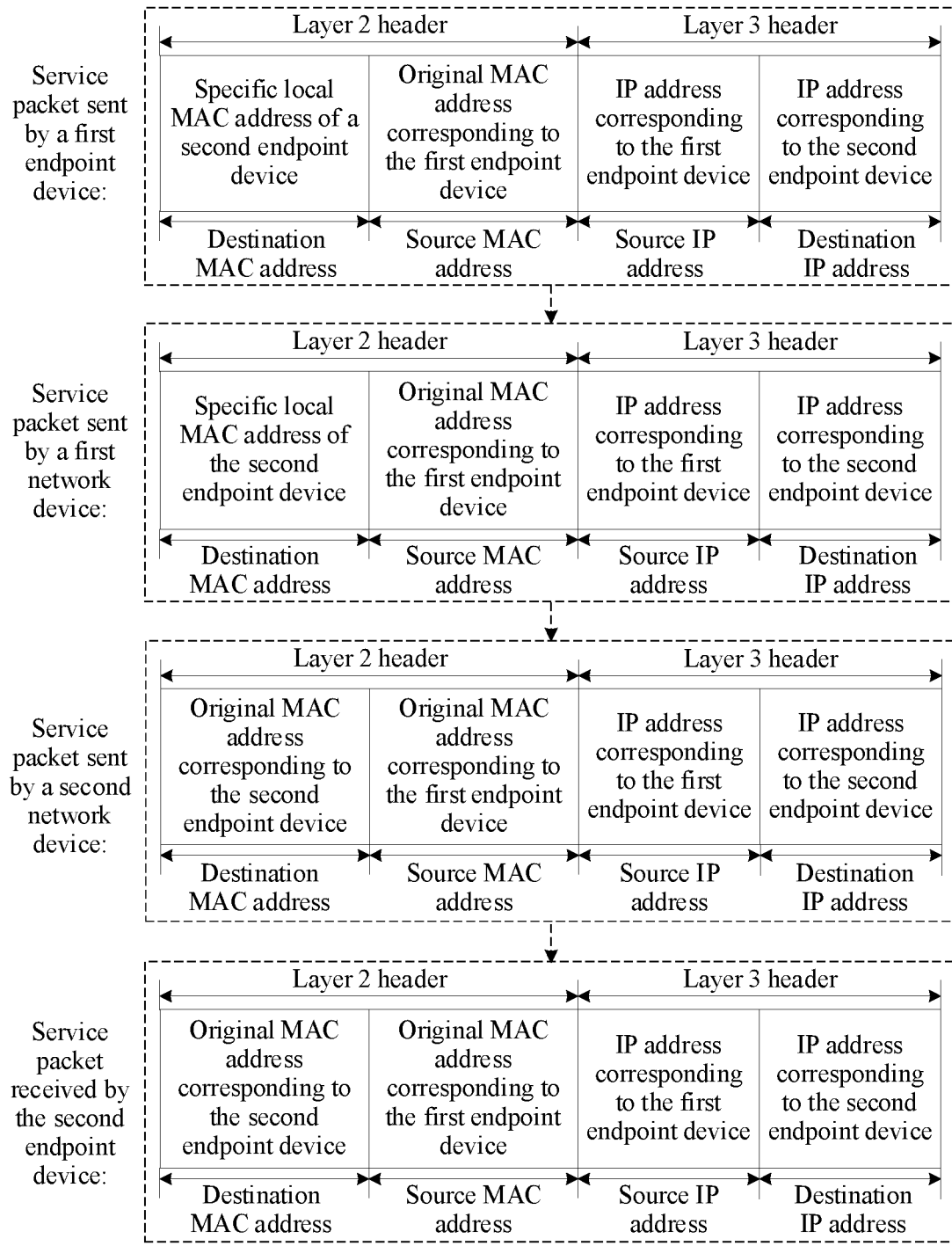
FIG. 9 is a schematic diagram of a frame structure of a service packet according to an embodiment of this disclosure.

As shown in FIG. 9, in a layer 2 header of the service packet sent by the first endpoint device, a source MAC address may be an original MAC address corresponding to the first endpoint device, and a destination MAC address may be a specific local MAC address of a second endpoint device. In a layer 3 header of the service packet, a source IP address may be an IP address corresponding to the first endpoint device, and a destination IP address may be an IP address corresponding to the second endpoint device.

The original MAC address may be a MAC address that is written inside hardware by a device manufacturer during device production and whose bit width is 48 bits (or 6 bytes).

In a possible scenario, an endpoint device corresponds to a single user, that is, different users access a network device through different endpoint devices. An original MAC address corresponding to the endpoint device is an original MAC address of the endpoint device, and an IP address corresponding to the endpoint device is an IP address of the endpoint device.

In another possible scenario, an endpoint device corresponds to a plurality of users, that is, the plurality of users accesses a network device through a same endpoint device. An original MAC address corresponding to the endpoint device is an original MAC address of the user corresponding to the endpoint device, and an IP address corresponding to the endpoint device is an IP address of the user corresponding to the endpoint device.

In the foregoing two possible scenarios, the scenario in which the endpoint device corresponds to the single user may also be described as a single-user scenario, and the scenario in which the endpoint device corresponds to the plurality of users may also be described as a multi-user scenario.

For example, the single-user scenario may be a non-virtualized single-host server access scenario, a layer 3 gateway access scenario, or the like, and the multi-user scenario may be a multi-virtual machine access scenario, a multi-container access scenario, or another multi-user MAC access scenario.

A non-virtualized single-host server may be a common physical server, or may be described as a server that does not enable a virtualization technology of a virtual machine, a container, or the like. Layer 3 gateway access may mean that a port of a directly connected network device is configured with a gateway IP address, and is a boundary point between a layer 2 network and a layer 3 network.

Optionally, a control device configures a specific local MAC address of each endpoint device through the network device.

Optionally, the network device stores a specific local MAC address of an endpoint device accessing the network device.

Optionally, the first endpoint device learns of the specific local MAC address of the second endpoint device based on an ARP packet with reference to a specific local MAC address learning procedure shown in FIG. 15 below. Details are not described herein.

When the first endpoint device sends the service packet to the second endpoint device, the first endpoint device may send the service packet carrying the learned specific local MAC address of the second endpoint device to the first network device.

Figure 10A:
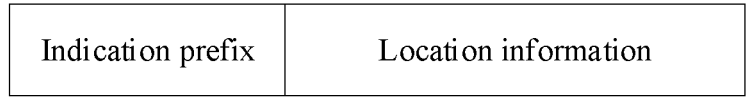
FIG. 10A and FIG. 10B are schematic diagrams of a frame structure of a specific local MAC address according to an embodiment of this disclosure.

Based on the foregoing two possible scenarios, as shown in FIG. 10A, the specific local MAC address may include an indication prefix and location information.

The indication prefix may indicate that the specific local MAC address includes the location information.

For example, the indication prefix may be a manufacturer identifier.

Optionally, a bit width of the indication prefix is flexibly adjusted based on an actual communication scenario. This is not limited.

For example, the bit width of the indication prefix may be 24 bits (or 3 bytes).

Optionally, the indication prefix is further used to distinguish between the specific local MAC address and the original MAC address.

For example, the indication prefix may be an identifier or a special prefix, for example, a manufacturer identifier, that may also be used to distinguish between the specific local MAC address and the original MAC address on a basis of indicating that the specific local MAC address includes the location information. This is not limited.

It should be noted that the indication prefix may alternatively be described as a special prefix, a specific prefix, a variable prefix, or the like. This is not limited.

The location information may indicate an access location of the endpoint device in a network.

For example, the access location corresponding to the location information may indicate the network device accessed by the endpoint device and a port through which the endpoint device accesses the network device.

For example, an endpoint device 1 accesses an Ethernet through a port 1 of a network device 1. Location information in a specific local MAC address of the endpoint device 1 may indicate the network device 1 and the port 1 of the network device 1.

The port may be a physical port or a logical port. When the port is a logical port, the network may support access of a logical entity to a physical port. When the port is abnormal, fast detection and switching may be performed, to ensure high reliability of service traffic forwarding, and improve communication reliability of the network.

Figure 11:
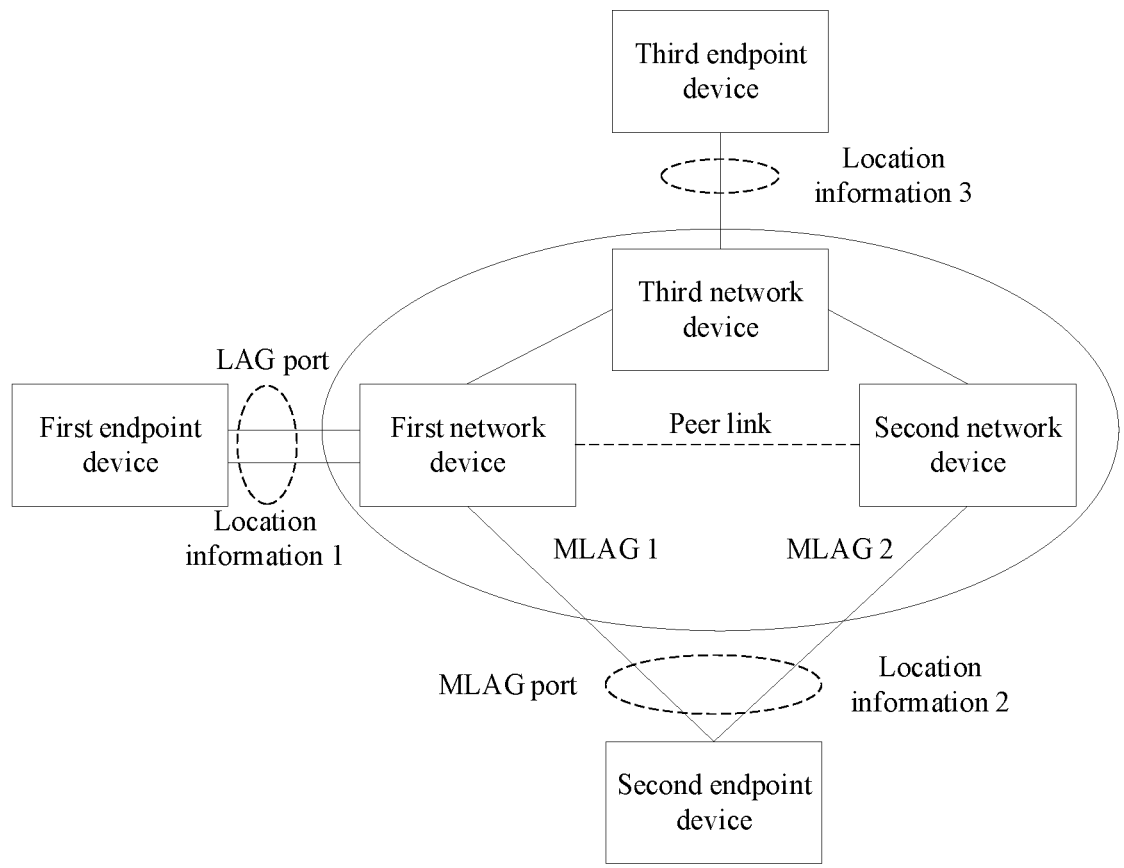
FIG. 11 is a schematic diagram of a port according to an embodiment of this disclosure.

For example, as shown in FIG. 11, the port may be a physical port, or may be a link aggregation group (LAG) port formed by aggregating a plurality of physical ports, or may be a multichassis LAG (MLAG) port, or may be a logical port or the like in a logical access scenario such as a multi-homing access scenario.

It should be noted that, when the port is a logical port, the control device may dynamically control the location information corresponding to the port. For example, the control device may allocate the location information when the port is online and created, and release the location information when the port is offline and destroyed.

In an example, the location information may be an integrated identifier. To be specific, the integrated identifier indicates both the network device accessed by the endpoint device and the port through which the endpoint device accesses the network device.

Optionally, a bit width of the location information may be flexibly adjusted based on an actual communication scenario. This is not limited.

For example, the bit width of the location information may be 24 bits (or 3 bytes).

For example, network devices accessed by endpoint devices include a network device 1 and a network device 2, the network device 1 includes a port 1 and a port 2, and the network device 2 includes a port 1 and a port 2. Assuming that the bit width of the location information is 24 bits, the location information may be set to 000000000000000000000000 to indicate the port 1 of the network device 1, the location information may be set to 000000000000000000000001 to indicate the port 2 of the network device 1, the location information may be set to 000000000000000000000010 to indicate the port 1 of the network device 2, and the location information may be set to 000000000000000000000011 to indicate the port 2 of the network device 2.

Figure 10B:
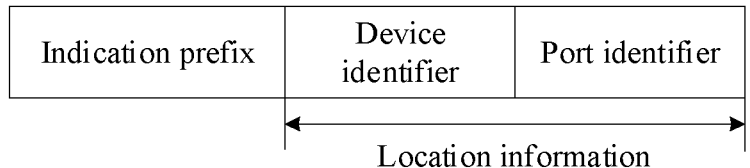

In another example, as shown in FIG. 10B, the location information may include a device identifier and a port identifier.

The device identifier may indicate the network device accessed by the endpoint device, and the port identifier may indicate the port through which the endpoint device accesses the network device.

Optionally, bit widths of the device identifier and the port identifier may be flexibly adjusted based on an actual communication scenario. This is not limited.

For example, the bit width of the device identifier may be 16 bits (or 2 bytes), or may be 8 bits (or 1 byte), and the bit width of the port identifier may be 8 bits (or 1 byte).

For example, network devices accessed by endpoint devices include a network device 1 and a network device 2, the network device 1 includes a port 1 and a port 2, and the network device 2 includes a port 1 and a port 2. Assuming that the bit width of the device identifier is 16 bits, and the bit width of the port identifier is 8 bits, the location information may be set to 000000000000000000000000 to indicate the port 1 of the network device 1, the location information may be set to 000000000000000000000001 to indicate the port 2 of the network device 1, the location information may be set to 000000000000000100000000 to indicate the port 1 of the network device 2, and the location information may be set to 000000000000000100000001 to indicate the port 2 of the network device 2.

It should be noted that, based on the specific local MAC address shown in FIGS. 10A and 10B, for the foregoing single-user scenario, different users correspond to different endpoint devices, and the network device accessed by the endpoint device may store a correspondence between the port identifier and the original MAC address of the endpoint device, so that when receiving a packet whose destination MAC address is the specific local MAC address, the network device modifies, based on the port corresponding to the specific local MAC address, the specific local MAC address to an original MAC address corresponding to the port, and sends a modified packet to the endpoint device.

Based on the specific local MAC address shown in FIGS. 10A and 10B, for the foregoing multi-user scenario, a plurality of users corresponds to a same endpoint device, and the plurality of users corresponding to the same endpoint device may correspond to a same specific local MAC address. The network device accessed by the endpoint device may store a mapping relationship between the IP address of the user and the original MAC address of the user, so that when receiving a packet whose destination MAC address is the specific local MAC address and whose destination IP address is the IP address of the user, the network device modifies the specific local MAC address to an original MAC address corresponding to the destination IP address, and sends a modified packet to the endpoint device.

Based on the second possible design, as shown in FIG. 12A or FIG. 12B, the specific local MAC address may include an indication prefix, location information, and a user identifier.

For descriptions of the indication prefix and the location information, refer to descriptions of the indication prefix and the location information in FIG. 10A and FIG. 10B. Details are not described.

The user identifier may indicate the original MAC address of the user corresponding to the endpoint device.

Optionally, a bit width of the user identifier is flexibly adjusted based on an actual communication scenario. This is not limited.

For example, the bit width of the user identifier may be 8 bits.

In this embodiment of this disclosure, the user identifier is added to the specific local MAC address, so that support for multi-user MAC can be implemented.

In a possible design, in the specific local MAC address, the user corresponding to the endpoint device is distinguished by using the user identifier.

For example, when a plurality of ports of the network device correspond to a same user identifier resource pool, the user corresponding to the endpoint device may be distinguished based on the user identifier.

Based on this possible design, for the foregoing multi-user scenario, for a same endpoint device, different users correspond to different specific local MAC addresses, and the network device accessed by the endpoint device may store a correspondence between the user identifier and the original MAC address of the user, so that when receiving the packet whose destination MAC address is the specific local MAC address, the network device modifies, based on the user identifier in the specific local MAC address, the specific local MAC address to the original MAC address corresponding to the user identifier, and sends a modified packet to the endpoint device.

In another possible design, when the location information includes the port identifier, the user corresponding to the endpoint device is distinguished by using the port identifier and the user identifier.

For example, when a plurality of ports of the network device correspond to different user identifier resource pools, user identifiers in the different user identifier resource pools may be the same, that is, user identifiers of users accessing the network device through different ports may be the same. In this case, the user corresponding to the endpoint device may be distinguished based on the port identifier and the user identifier.

Based on this possible design, for the foregoing multi-user scenario, for a same endpoint device, different users correspond to different specific local MAC addresses, and the network device accessed by the endpoint device may store a correspondence between the port identifier and the user identifier and the original MAC address of the user, so that when receiving the packet whose destination MAC address is the specific local MAC address, the network device modifies, based on the port identifier and the user identifier that correspond to the specific local MAC address, the specific local MAC address to the original MAC address corresponding to the port identifier and the user identifier, and sends a modified packet to the endpoint device.

Based on the specific local MAC address shown in FIGS. 10A and 10B and FIGS. 12A and 12B, when the bit width of the specific local MAC address is fixed, compared with the specific local MAC address including the user identifier, the specific local MAC address not including the user identifier supports a larger network capacity.

It should be noted that, in this embodiment of this disclosure, the specific local MAC address is a MAC address with semantic information. The semantic information may be the location information indicating the access location of the endpoint device in the network. The specific local MAC address may also be described as a local forwarding MAC address, a location-related MAC address, a specific semantic MAC address, or the like. Details are not described.

Step 802: The first network device determines an egress port from a preset routing table based on the location information in the specific local MAC address of the second endpoint device.

The egress port may be the port of the network device. The routing table may include the location information and the egress port corresponding to the location information.

For example, as shown in Table 2 below, the routing table may include the location information and the egress port corresponding to the location information.

TABLE 2

| Location information | Egress port |
| --- | --- |
| Location information 1 | Port 1 |
| Location information 2 | Port 2 |
| Location information 3 | Port 3 |
| Location information 4 | Port 4 |

Optionally, the first network device receives the routing table dynamically delivered or statically configured by the control device.

Further, the first network device may determine the specific local MAC address of the second endpoint device based on the destination MAC address of the service packet sent by the first endpoint device, determine the location information based on the specific local MAC address of the second endpoint device, and search the routing table based on the location information to determine the egress port.

Step 803: The first network device sends the service packet of the first endpoint device through the egress port. Correspondingly, a second network device obtains the service packet of the first endpoint device.

The first endpoint device may determine the egress port from the routing table based on the location information in the specific local MAC address of the second endpoint device. As shown in FIG. 9, when sending the service packet of the first endpoint device through the egress port, the first network device does not need to perform processing such as modification and replacement on the service packet, so that a packet forwarding delay and forwarding processing complexity can be reduced.

It should be noted that, when the first network device is directly connected to the second network device, the first network device may send the service packet of the first endpoint device to the second network device, or when there is one or more intermediate network devices between the first network device and the second network device, the first network device sends the service packet of the first endpoint device to the second network device through the intermediate network device.

Step 804: The second network device determines the egress port based on the specific local MAC address of the second endpoint device.

In a possible design, the second network device determines the egress port from the preset routing table based on the location information in the specific local MAC address of the second endpoint device.

The egress port is the port of the network device. The routing table may include the location information and the egress port corresponding to the location information.

Optionally, the second network device receives the routing table dynamically delivered or statically configured by the control device.

Further, the second network device may determine the specific local MAC address of the second endpoint device based on the destination MAC address of the received service packet of the first endpoint device, determine the location information based on the specific local MAC address of the second endpoint device, and search the routing table based on the location information to determine the egress port.

In another possible design, the second network device determines a port corresponding to the specific local MAC address of the second endpoint device as the egress port.

When the specific local MAC address of the second endpoint device includes the port identifier, the second network device may determine the port indicated by the port identifier as the egress port.

In comparison with that the second network device determines the egress port by using the routing table, that the second network device determines the port corresponding to the specific local MAC address of the second endpoint device as the egress port can avoid a table lookup operation, so that the packet forwarding delay and forwarding processing complexity are further reduced.

In still another possible design, the second network device determines, based on the specific local MAC address of the second endpoint device, an original MAC address corresponding to the second endpoint device, and determines the egress port based on the original MAC address corresponding to the second endpoint device.

The second network device may determine the original MAC address corresponding to the second endpoint device with reference to descriptions in step 805 below. Details are not described herein.

Step 805: The second network device modifies the specific local MAC address of the second endpoint device in the service packet to the original MAC address corresponding to the second endpoint device.

In an example, for a scenario in which the endpoint device corresponds to a single user, and the specific local MAC address includes the indication prefix and the location information, the original MAC address corresponding to the second endpoint device is a MAC address of the second endpoint device. The second network device may determine the original MAC address of the second endpoint device based on a fourth correspondence and the port corresponding to the specific local MAC address of the second endpoint device.

The fourth correspondence may include the port identifier and the original MAC address of the endpoint device corresponding to the port identifier.

For example, the fourth correspondence may be a table shown in Table 3 below:

TABLE 3

| Port identifier | Original MAC address |
| --- | --- |
| Port 1 | Original MAC 1 |
| Port 2 | Original MAC 2 |
| Port 3 | Original MAC 3 |
| Port 4 | Original MAC 4 |

The fourth correspondence may be sent by the control device to the network device, or may be stored by the network device in the specific local MAC address learning procedure shown in FIG. 15 below.

In another example, for a scenario in which the endpoint device corresponds to a plurality of users, and the specific local MAC address includes the indication prefix and the location information, the original MAC address corresponding to the second endpoint device is a MAC address of the user corresponding to the second endpoint device. The second network device may determine, based on the IP address of the user, the original MAC address corresponding to the IP address, and the destination IP address of the service packet, the original MAC address corresponding to the destination IP address as the MAC address of the user corresponding to the second endpoint device.

The destination IP address of the service packet is the IP address of the user corresponding to the second endpoint device.

For example, the IP address of the user and the original MAC address corresponding to the IP address may be a table shown in Table 4 below:

TABLE 4

| IP address | Original MAC address |
| --- | --- |
| IP 1 | Original MAC 1 |
| IP 2 | Original MAC 2 |
| IP 3 | Original MAC 3 |
| IP 4 | Original MAC 4 |

The IP address of the user and the original MAC address corresponding to the IP address may be sent by the control device to the network device, or may be stored by the network device in the specific local MAC address learning procedure shown in FIG. 15 below.

In another example, for a scenario in which the endpoint device corresponds to a plurality of users, and the specific local MAC address includes the indication prefix, the location information, and the user identifier, the original MAC address corresponding to the second endpoint device is a MAC address of the user corresponding to the second endpoint device. When the user identifier is used to distinguish between the users corresponding to the endpoint device, the second network device may determine the original MAC address of the second endpoint device based on a fifth correspondence and the user identifier in the specific local MAC address of the second endpoint device.

The fifth correspondence may include the user identifier and the original MAC address of the user corresponding to the user identifier.

For example, the fifth correspondence may be a table shown in Table 5 below:

TABLE 5

| User identifier | Original MAC address |
| --- | --- |
| User identifier 1 | Original MAC 1 |
| User identifier 2 | Original MAC 2 |
| User identifier 3 | Original MAC 3 |
| User identifier 4 | Original MAC 4 |

The fifth correspondence may be sent by the control device to the network device.

In still another example, for a scenario in which the endpoint device corresponds to a plurality of users, and the specific local MAC address includes the indication prefix, the location information, and the user identifier, the original MAC address corresponding to the second endpoint device is a MAC address of the user corresponding to the second endpoint device. When the port identifier and the user identifier are used to distinguish between the users corresponding to the endpoint device, the second network device may determine the original MAC address of the second endpoint device based on a sixth correspondence and the port identifier and the user identifier that correspond to the specific local MAC address of the second endpoint device.

The sixth correspondence may include the port identifier and the user identifier, and the original MAC address of the user corresponding to the port identifier and the user identifier. For example, the sixth correspondence may be a table shown in Table 6 below:

TABLE 6

| (Port identifier + user identifier) | Original MAC address |
|---|---|
| (Port identifier + user identifier) 1 | Original MAC 1 |
| (Port identifier + user identifier) 2 | Original MAC 2 |
| (Port identifier + user identifier) 3 | Original MAC 3 |
| (Port identifier + user identifier) 4 | Original MAC 4 |

The sixth correspondence may be sent by the control device to the network device, or may be stored by the network device in the specific local MAC address learning procedure shown in FIG. 15 below.

Based on the foregoing four examples, after determining the original MAC address corresponding to the second endpoint device, the second endpoint device may modify the specific local MAC address of the second endpoint device in the service packet to the original MAC address corresponding to the second endpoint device.

It should be noted that there is no limitation on a sequence of performing step 804 and step 805. Step 804 may be performed before step 805, or step 805 may be performed before step 804, or step 804 and step 805 may be performed at the same time. This is not limited.

Step 806: The second network device sends the modified service packet to the second endpoint device through the egress port. Correspondingly, the second endpoint device receives the modified service packet sent by the second network device.

As shown in FIG. 9, in a layer 2 header of the modified service packet, the source MAC address may be the original MAC address corresponding to the first endpoint device, and the destination MAC address may be the original MAC address corresponding to the second endpoint device. In a layer 3 header of the service packet, the source IP address may be the IP address corresponding to the first endpoint device, and the destination IP address may be the IP address corresponding to the second endpoint device.

Further, after receiving the modified service packet sent by the second network device, the second endpoint device may send, based on the destination MAC address of the modified service packet, the modified service packet to the user corresponding to the destination MAC address.

For example, when the destination MAC address is the original MAC address of the second endpoint device, the second endpoint device may send the modified service packet to the user that accesses the network device through the second endpoint device.

For example, when the destination MAC address is the original MAC address of the user corresponding to the second endpoint device, the second endpoint device may send the modified service packet to the user corresponding to the destination MAC address.

In the communication method shown in FIG. 8 to FIGS. 12A and 12B, the first network device may forward a packet based on the specific local MAC address and the routing table, that is, forward the packet based on a layer 2 network and a layer 3 network. The specific local MAC address including the location information is used, so that the first network device may perform linear table lookup based on a data plane, and forward the packet based on a table lookup result. In comparison with a network interconnection architecture in which the layer 2 network and the layer 3 network are combined for table lookup and forwarding based on an IP address, when performing table lookup and forwarding based on the specific local MAC address, the first network device may not need to perform processing such as modification and replacement on the service packet, so that a packet forwarding delay and forwarding processing complexity are reduced. This overcomes a disadvantage of the network interconnection architecture in which the layer 2 network and the layer 3 network are combined for table lookup and forwarding based on the IP address, and supports large-scale networking deployment. In addition, in comparison with a network architecture in which packet forwarding is performed based on the layer 2 network, a problem of a loop and a decrease in link utilization that are caused when packet forwarding is performed through the layer 2 network can be resolved.

Figure 13:
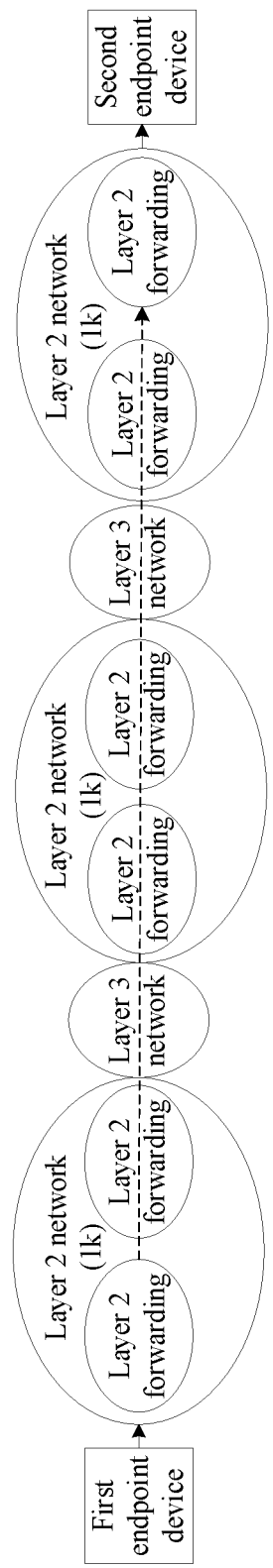
FIG. 13 is a schematic diagram of a network interconnection architecture in which a layer 2 network and a layer 3 network are combined for table lookup and forwarding based on an IP address according to an embodiment of this disclosure.
Figure 14A:
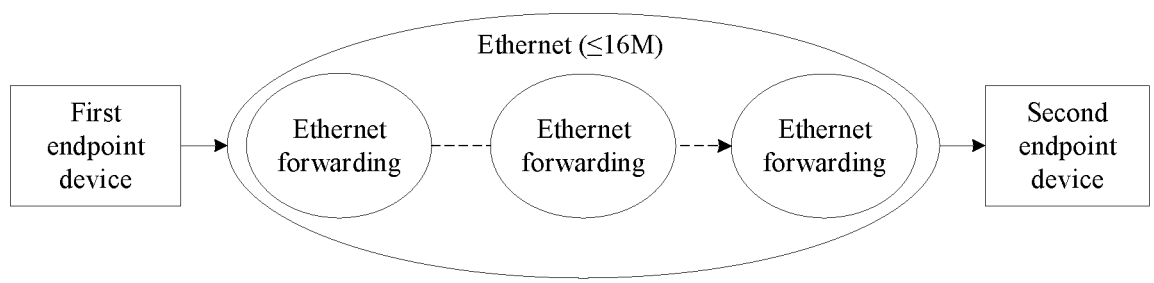
FIG. 14A and FIG. 14B are schematic diagrams of a low-delay network interconnection architecture according to an embodiment of this disclosure.
Figure 14B:
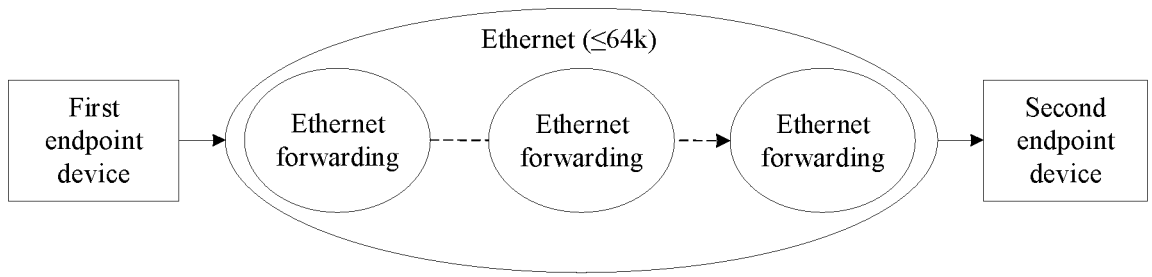

For example, in comparison with the network interconnection architecture in which the layer 2 network and the layer 3 network are combined for table lookup and forwarding based on the IP address shown in FIG. 13, for the scenario in which the endpoint device corresponds to the single user and the specific local MAC address includes the indication prefix and the location information, or the scenario in which the endpoint device corresponds to the plurality of users and the specific local MAC address includes the indication prefix and the location information, as shown in FIG. 14A, the network interconnection architecture provided in this embodiment of this disclosure can support maximum access of 16 M users, or for the scenario in which the endpoint device corresponds to the plurality of users, and the specific local MAC address includes the indication prefix and the location information, as shown in FIG. 14B, the network interconnection architecture provided in this embodiment of this disclosure can support maximum access of a 64 K network capacity and 16 M virtual users. Based on the communication method provided in this embodiment of this disclosure, a single-hop forwarding delay of the network device may be reduced from about 400 ns to about 100 ns, and the like.

Based on the communication method shown in FIG. 3 to FIGS. 14A and 14B, before sending the service packet, the first endpoint device may learn of the specific local MAC address of the second endpoint device based on the specific local MAC address learning procedure shown in FIG. 15 below. When sending the service packet to the second endpoint device, the first endpoint device may include the specific local MAC address of the second endpoint device in the service packet, so that the network device forwards the service packet based on the specific local MAC address of the second endpoint device, to reduce the packet forwarding delay and forwarding complexity.

Figure 15:
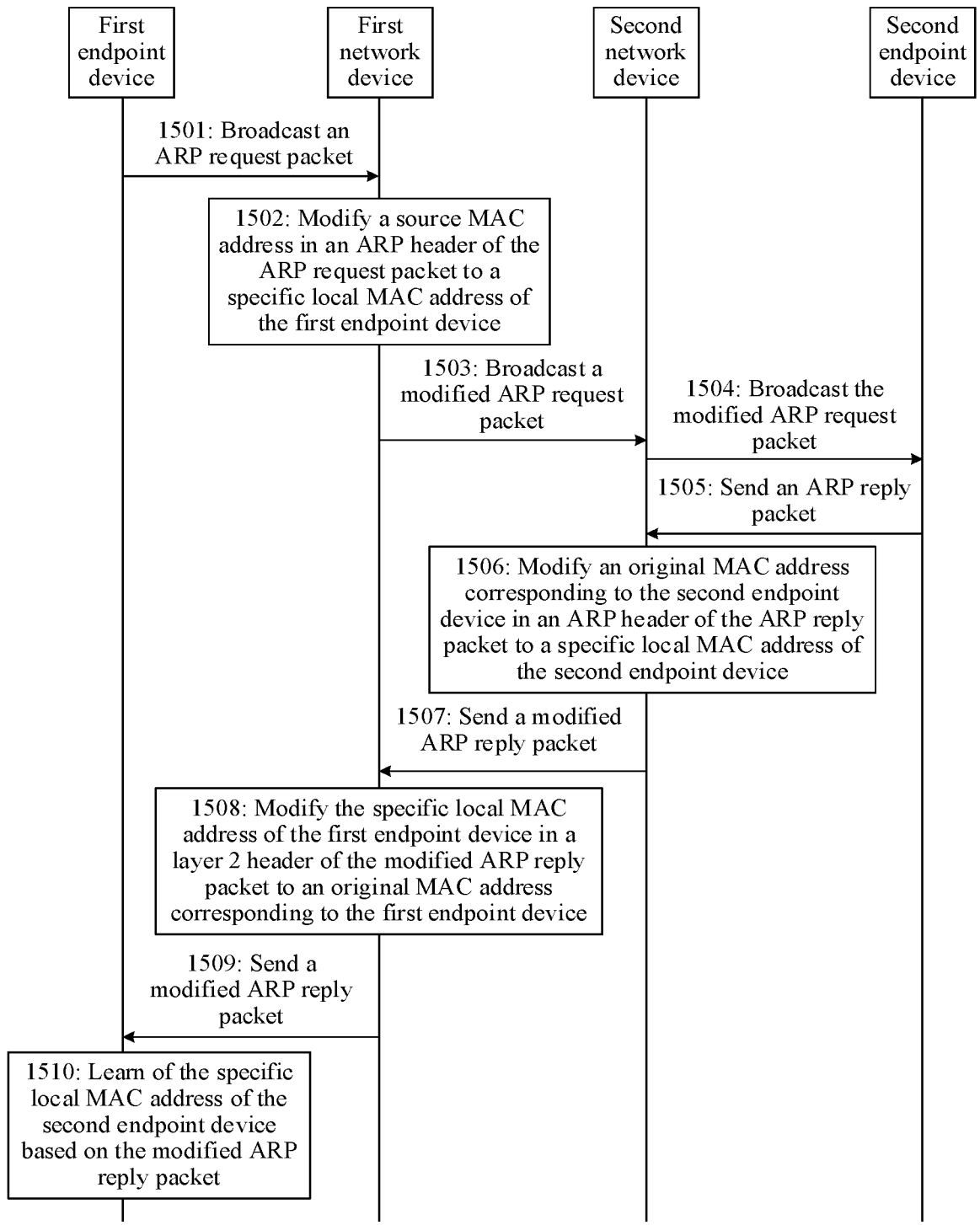
FIG. 15 is a schematic diagram of a specific local MAC address learning procedure according to an embodiment of this disclosure.

FIG. 15 is a schematic diagram of a specific local MAC address learning procedure according to an embodiment of this disclosure. As shown in FIG. 15, the method may include the following steps.

Step 1501: A first endpoint device broadcasts an ARP request packet. Correspondingly, a first network device receives the ARP request packet broadcast by the first endpoint device.

Figure 16:
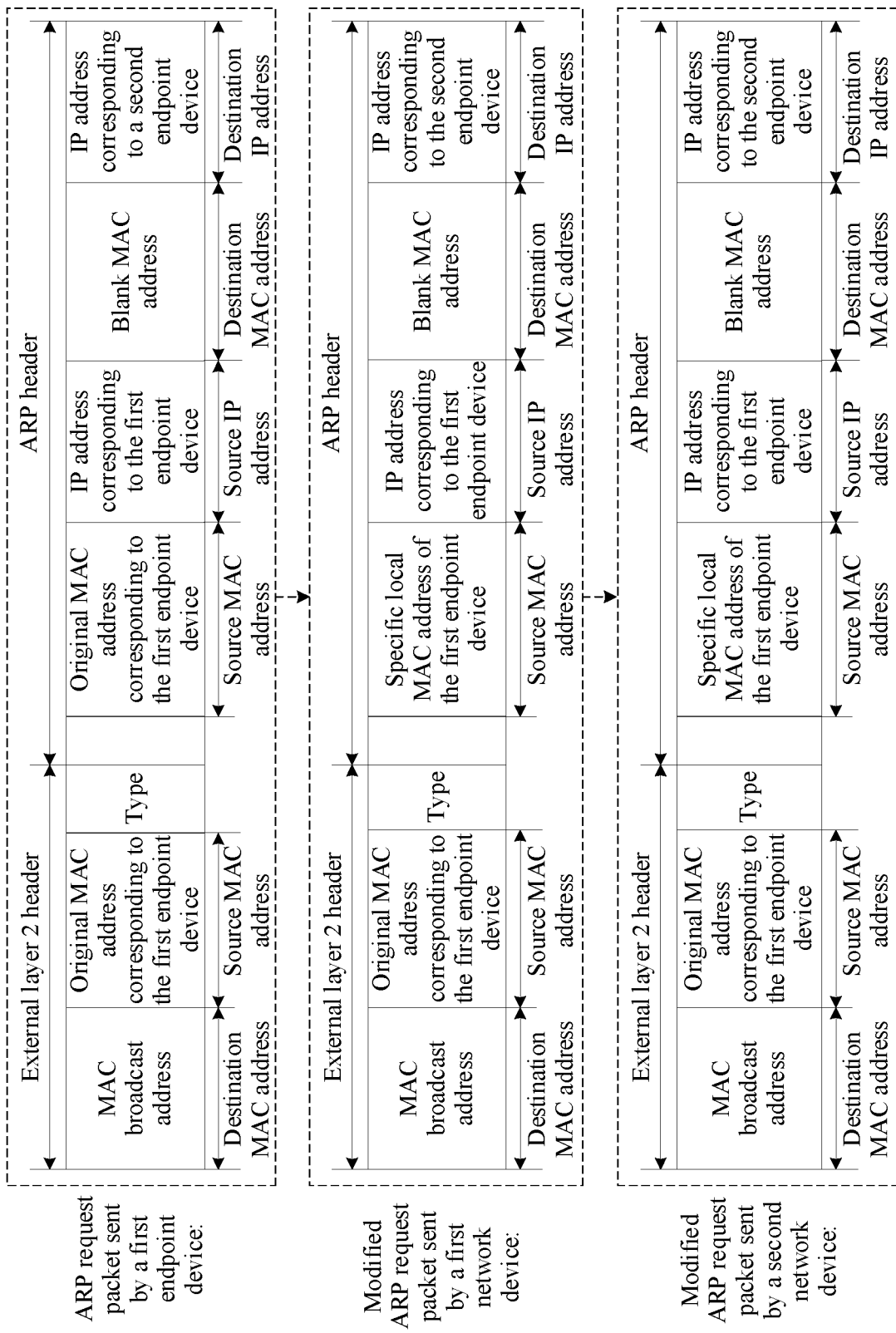
FIG. 16 is a schematic diagram of a frame structure of an ARP request packet according to an embodiment of this disclosure.

As shown in FIG. 16, in an external layer 2 header of the ARP request packet, a source MAC address is an original MAC address corresponding to the first endpoint device, and a destination MAC address is a MAC broadcast address. In an APR header of the ARP request packet, a source MAC address is an original MAC address corresponding to the first endpoint device, a destination MAC address is a blank MAC address, a source IP address is an IP address corresponding to the first endpoint device, and a destination IP address is an IP address corresponding to a second endpoint device.

For descriptions of an original MAC address corresponding to an endpoint device and an IP address corresponding to the endpoint device, refer to specific descriptions of the original MAC address corresponding to the endpoint device and the IP address corresponding to the endpoint device in FIG. 8. Details are not described.

Step 1502: The first network device modifies the source MAC address in the ARP header of the ARP request packet to a specific local MAC address of the first endpoint device.

In a possible design, for a single-user scenario, a specific local MAC address of the endpoint device includes an indication prefix and location information.

For descriptions of the indication prefix, refer to descriptions of the indication information in FIG. 8. Details are not described.

For example, the first network device may determine the location information of the first endpoint device based on the first network device accessed by the first endpoint device and a port through which the first endpoint device accesses the first network device.

The location information may be the integrated identifier shown in FIG. 10A, or may be the device identifier and the port identifier shown in FIG. 10B.

In another example, the first network device may determine the location information of the first endpoint device based on a first correspondence and the port through which the first endpoint device accesses the first network device.

The first correspondence may include the port identifier and the location information corresponding to the port identifier.

For example, the first correspondence may be a table shown in Table 7 below:

TABLE 7

| Port identifier | Location information |
| --- | --- |
| Port identifier 1 | Location information 1 |
| Port identifier 2 | Location information 2 |
| Port identifier 3 | Location information 3 |
| Port identifier 4 | Location information 4 |

The sixth correspondence may be sent by a control device to a network device.

Further, the first network device may determine the specific local MAC address of the first endpoint device based on the indication prefix and the location information.

In another possible design, for a multi-user scenario, a specific local MAC address of the endpoint device includes an indication prefix and location information.

Figure 17:
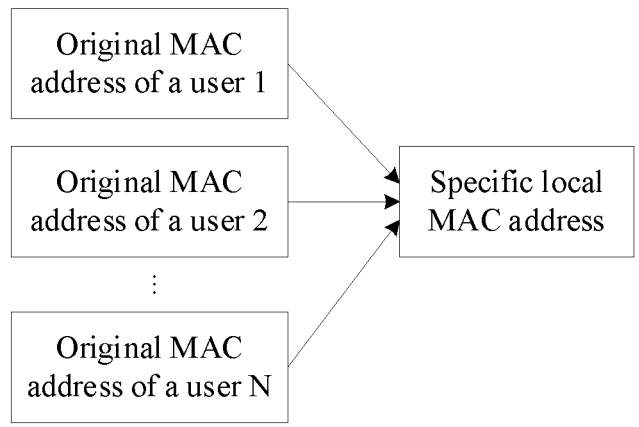
FIG. 17 is a schematic diagram of a correspondence between an original MAC address of a user and a specific local MAC address according to an embodiment of this disclosure.

For example, as shown in FIG. 17, original MAC addresses of a plurality of users corresponding to a same endpoint device may correspond to a same specific local MAC address.

For a specific process in which the first network device determines the specific local MAC address of the first endpoint device, refer to specific descriptions that the first network device determines the specific local MAC address for the first endpoint device in the foregoing single-user scenario. Details are not described.

It should be noted that, in the multi-user scenario, a source MAC address corresponding to the first endpoint device is an original MAC address of a user corresponding to the first endpoint device, an IP address corresponding to the first endpoint device is an IP address of the user corresponding to the first endpoint device, and the first network device may store a correspondence between the IP address of the user and the MAC address of the user based on the ARP request packet.

In still another possible design, for a multi-user scenario, a specific local MAC address of the endpoint device includes an indication prefix, location information, and a user identifier.

Figure 18:
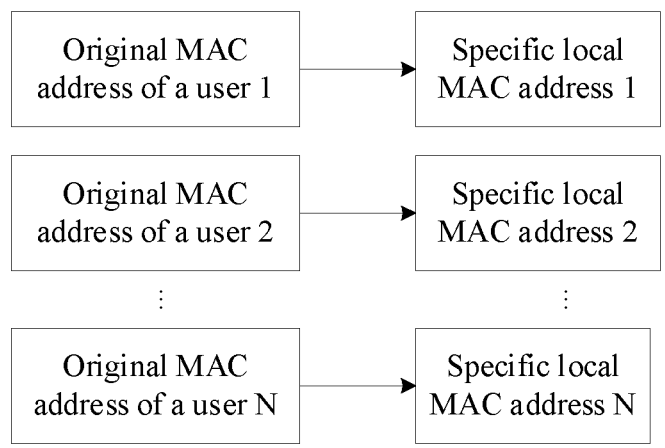
FIG. 18 is a schematic diagram of a correspondence between an original MAC address of a user and a specific local MAC address according to an embodiment of this disclosure.

For example, as shown in FIG. 18, original MAC addresses of different users may correspond to different specific local MAC addresses.

For a specific process in which the first network device determines the indication prefix and the location information of the first endpoint device, refer to specific descriptions that the first network device determines the indication prefix and the location information for the first endpoint device in the foregoing single-user scenario. Details are not described.

For descriptions of the user identifier, refer to descriptions of the user identifier in FIGS. 12A and 12B. Details are not described herein.

For example, the first network device may determine, based on a second correspondence and the original MAC address of the user corresponding to the first endpoint device, the user identifier of the user corresponding to the first endpoint device.

The second correspondence may include the original MAC address of the user and the user identifier corresponding to the original MAC address of the user.

For example, the second correspondence may be a table shown in Table 8 below:

TABLE 8

| Original MAC address of the user | User identifier |
| --- | --- |
| Original MAC address 1 | User identifier 1 |
| Original MAC address 2 | User identifier 2 |
| Original MAC address 3 | User identifier 3 |
| Original MAC address 4 | User identifier 4 |

The second correspondence may be sent by the control device to the network device.

In another example, the first network device may determine, based on a third correspondence and the original MAC address of the user corresponding to the first endpoint device, the user identifier of the user corresponding to the first endpoint device.

The third correspondence may include the original MAC address of the user and a port identifier and a user identifier corresponding to the original MAC address of the user.

For example, the third correspondence may be a table shown in Table 9 below:

TABLE 9

| Original MAC address of the user | Port identifier + user identifier |
| --- | --- |
| Original MAC address 1 | (Port identifier + user identifier) 1 |
| Original MAC address 2 | (Port identifier + user identifier) 2 |
| Original MAC address 3 | (Port identifier + user identifier) 3 |
| Original MAC address 4 | (Port identifier + user identifier) 4 |

The third correspondence may be sent by the control device to the network device.

Further, the first network device may determine the specific local MAC address of the first endpoint device based on the indication prefix, the location information, and the user identifier.

Based on the foregoing three possible designs, the first network device may modify the source MAC address in the ARP header of the ARP request packet to the specific local MAC address of the first endpoint device.

Step 1503: The first network device broadcasts a modified ARP request packet. Correspondingly, the second network device receives the modified ARP request packet.

As shown in FIG. 16, in the modified ARP request packet broadcast by the first network device, the source MAC address in the ARP header is the specific local MAC address of the first endpoint device.

Step 1504: The second network device broadcasts the modified ARP request packet. Correspondingly, the second endpoint device receives the modified ARP request packet.

As shown in FIG. 16, in the modified ARP request packet broadcast by the second network device, the source MAC address in the ARP header is the specific local MAC address of the first endpoint device.

Step 1505: The second endpoint device sends an ARP reply packet based on the received modified ARP request packet. Correspondingly, the second network device receives the ARP reply packet.

The second endpoint device may learn of the specific local MAC address of the first endpoint device based on the received modified ARP request packet, and may further modify a destination MAC address in the ARP header of the modified ARP request packet to an original MAC address corresponding to the second endpoint device, and determine the ARP reply packet.

Figure 19:
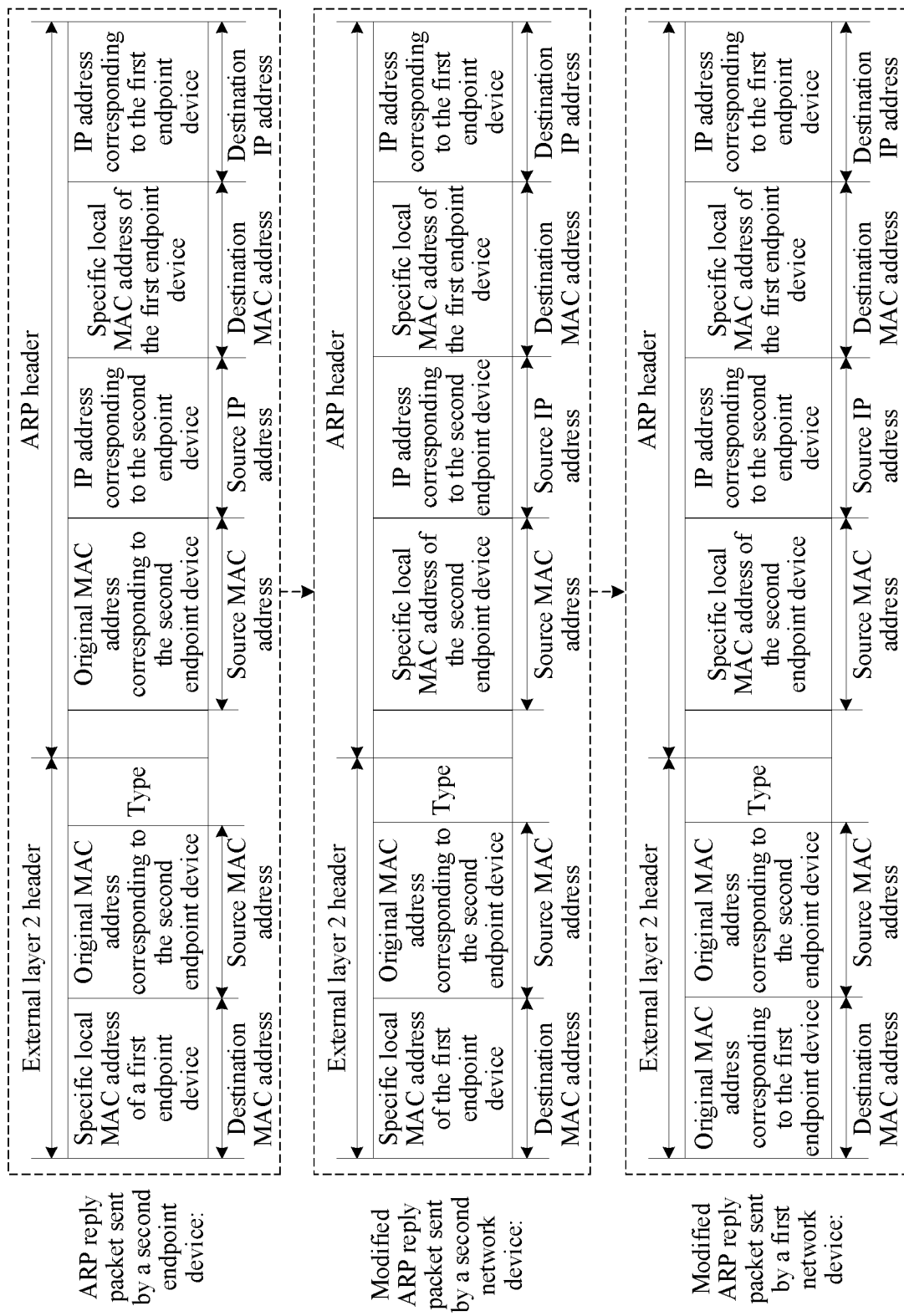
FIG. 19 is a schematic diagram of a frame structure of an ARP reply packet according to an embodiment of this disclosure.

For example, as shown in FIG. 19, in an external layer 2 header in the ARP reply packet, the source MAC address is the original MAC address corresponding to the second endpoint device, and the destination MAC address is the specific local MAC address of the first endpoint device. In the APR header of the ARP request packet, the source MAC address is the original MAC address corresponding to the second endpoint device, the destination MAC address is the specific local MAC address of the first endpoint device, the source IP address is the IP address corresponding to the second endpoint device, and the destination IP address is the IP address corresponding to the first endpoint device.

For descriptions of the original MAC address corresponding to the endpoint device and the IP address corresponding to the endpoint device, refer to specific descriptions of the original MAC address corresponding to the endpoint device and the IP address corresponding to the endpoint device in FIG. 8. Details are not described.

Step 1506: The second network device modifies the original MAC address corresponding to the second endpoint device in the ARP header of the ARP reply packet to the specific local MAC address of the second endpoint device.

The second network device may determine the specific local MAC address of the second endpoint device with reference to specific descriptions in step 1502 that the first network device determines the specific local MAC address of the first endpoint device, and modify the original MAC address corresponding to the second endpoint device in the ARP header of the ARP reply packet to the specific local MAC address of the second endpoint device. Details are not described herein.

Step 1507: The second network device sends a modified ARP reply packet based on the specific local MAC address of the first endpoint device. Correspondingly, the first network device receives the modified ARP reply packet.

For example, as shown in FIG. 19, a source MAC address in an ARP header of the modified ARP reply packet is the specific local MAC address of the second endpoint device.

Step 1508: The first network device modifies the specific local MAC address of the first endpoint device in a layer 2 header of the modified ARP reply packet to the original MAC address corresponding to the first endpoint device.

The first network device may modify the specific local MAC address of the first endpoint device in the layer 2 header of the modified ARP reply packet to the original MAC address corresponding to the first endpoint device with reference to descriptions in step 805 that the second network device modifies the specific local MAC address of the second endpoint device to the original MAC address corresponding to the second endpoint device. Details are not described herein.

Step 1509: The first network device sends a modified ARP reply packet to the first endpoint device.

For example, as shown in FIG. 19, a destination MAC address in an external layer 2 header of the modified ARP reply packet is the original MAC address corresponding to the first endpoint device, and the source MAC address in the APR header of the ARP request packet is the specific local MAC address of the second endpoint device.

Step 1510: The first endpoint device learns of the specific local MAC address of the second endpoint device based on the modified ARP reply packet.

The first endpoint device determines the specific local MAC address of the second endpoint device based on the source MAC address in the ARP header of the received modified ARP reply packet.

In the specific local MAC address learning procedure shown in FIG. 15 to FIG. 19, the network device accessed by the endpoint device may modify the original MAC address corresponding to the endpoint device in the ARP packet to the specific local MAC address of the endpoint device, so that a peer endpoint device learns of the specific local MAC address of the endpoint device, and when sending the service packet to the peer endpoint device, the endpoint device sends the service packet carrying a specific local MAC address of the peer endpoint device to the network device. In this way, when performing table lookup and forwarding based on the specific local MAC address, the network device may not need to perform processing such as modification and replacement on the service packet, so that a packet forwarding delay and forwarding processing complexity are reduced. This overcomes a disadvantage of the network interconnection architecture in which the layer 2 network and the layer 3 network are combined for table lookup and forwarding based on the IP address, and supports large-scale networking deployment. In addition, in comparison with a network architecture in which packet forwarding is performed based on the layer 2 network, a problem of a loop and a decrease in link utilization that are caused when packet forwarding is performed through the layer 2 network can be resolved.

It should be noted that, in the embodiments shown in FIG. 8 to FIG. 19, the endpoint device may not need to sense the specific local MAC address, regardless of a process in which the endpoint device learns of the specific local MAC address of the peer endpoint device by using the specific local MAC address learning procedure shown in FIG. 15, or a process in which the endpoint device communicates with the peer endpoint device by using the communication method shown in FIG. 8.

For example, the endpoint device is the first endpoint device, and the peer endpoint device may be the second endpoint device.

Figure 20:
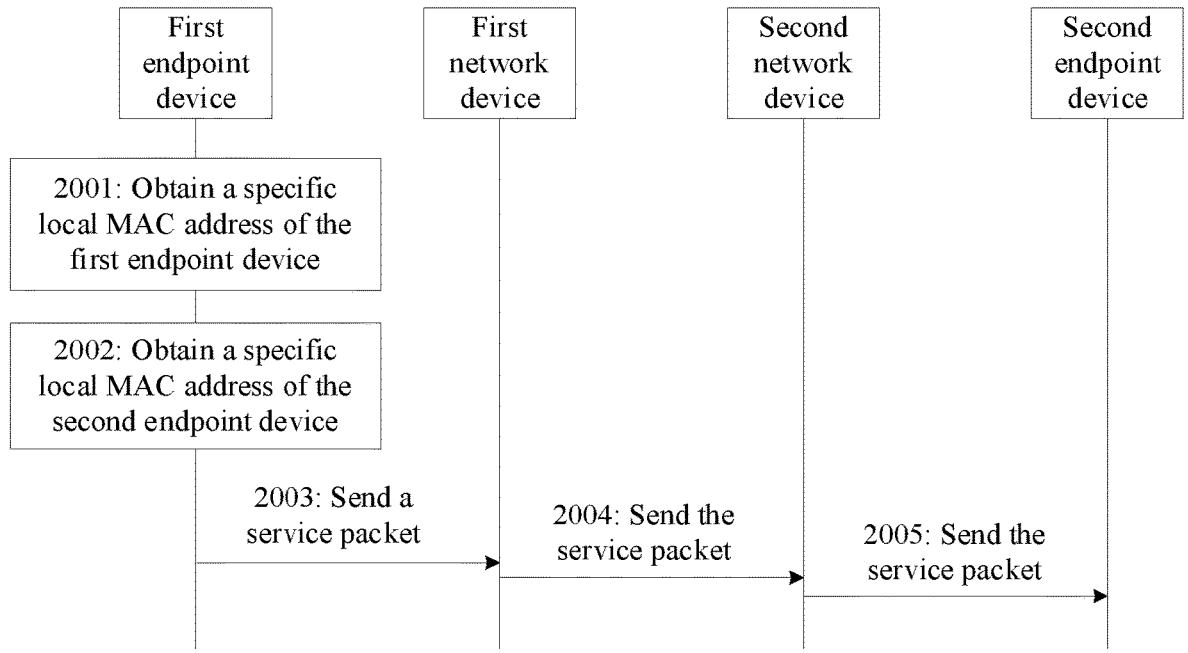
FIG. 20 is a flowchart of a communication method according to an embodiment of this disclosure.

In correspondence to that, shown in FIG. 8 to FIG. 19, the endpoint device does not need to sense the specific local MAC address, as shown in FIG. 20, the endpoint device may complete, based on a communication method shown in FIG. 20, the specific local MAC address learning procedure and the process of communicating with the peer endpoint device on a basis of sensing the specific local MAC address.

FIG. 20 is a flowchart of a communication method according to an embodiment of this disclosure. As shown in FIG. 20, the method may include the following steps.

Step 2001: A first endpoint device obtains a specific local MAC address of the first endpoint device.

For descriptions of the specific local MAC address, refer to descriptions of the specific local MAC address in FIG. 8. Details are not described herein.

For example, the first endpoint device may receive an original MAC address corresponding to an endpoint device and a specific local MAC address corresponding to the original MAC address that are sent by a first network device, and determine a specific local MAC address of the first endpoint device based on the original MAC address corresponding to the first endpoint device.

The first network device may determine the original MAC address corresponding to the endpoint device and the specific local MAC address corresponding to the original MAC address with reference to specific descriptions in step 1502 that the first network device determines the specific local MAC address of the first endpoint device, and send the original MAC address and the specific local MAC address to the first endpoint device.

For example, the original MAC address corresponding to the endpoint device and the specific local MAC address corresponding to the original MAC address that are sent by the first network device are shown in Table 10 below. Assuming that the original MAC address corresponding to the first endpoint device is an original MAC address 1, the first endpoint device may determine the specific local MAC address 1 as the specific local MAC address of the first endpoint device.

TABLE 10

| Original MAC address | Specific local MAC address |
| --- | --- |
| Original MAC address 1 | Specific local MAC address 1 |
| Original MAC address 2 | Specific local MAC address 2 |
| Original MAC address 3 | Specific local MAC address 3 |
| Original MAC address 4 | Specific local MAC address 4 |

Step 2002: The first endpoint device obtains a specific local MAC address of a second endpoint device.

For example, after obtaining the specific local MAC address of the first endpoint device, the first endpoint device may broadcast the specific local MAC address of the first endpoint device as a source MAC address in an ARP header of an ARP request packet based on a specific local MAC address learning procedure, and obtain an ARP reply packet carrying the specific local MAC address of the second endpoint device, so that the first endpoint device obtains the specific local MAC address of the second endpoint device based on the ARP reply packet, and the second endpoint device obtains the specific local MAC address of the first endpoint device based on the ARP request packet.

A destination IP address of the ARP request packet may be an IP address corresponding to the second endpoint device, a destination MAC address of the ARP reply packet is the specific local MAC address of the first endpoint device, and a source MAC address in an ARP header of the ARP reply packet is the specific local MAC address of the second endpoint device.

Step 2003: The first endpoint device sends a service packet to the first network device.

A source MAC address of the service packet is the specific local MAC address of the first endpoint device, and a destination MAC address of the service packet is the specific local MAC address of the second endpoint device.

Step 2004: The first network device sends the service packet. Correspondingly, a second network device receives the service packet.

The first network device may determine an egress port from a preset routing table based on the specific local MAC address of the second endpoint device in the service packet, and send the service packet through the egress port.

Further, the first network device may determine the egress port from the preset routing table based on location information in the specific local MAC address of the second endpoint device with reference to specific descriptions in step 802. Details are not described herein.

Step 2005: The second network device sends the service packet to the second endpoint device.

The second network device may determine the egress port based on the specific local MAC address of the second endpoint device, and send the service packet through the egress port.

Further, the second network device may determine the egress port based on the specific local MAC address of the second endpoint device with reference to specific descriptions in step 804. Details are not described herein.

Further, after receiving the service packet, the second endpoint device determines, based on the specific local MAC address of the second endpoint device in the service packet, an original MAC address corresponding to the second endpoint device, and sends the service packet to a user corresponding to the original MAC address.

Optionally, the second endpoint device modifies the specific local MAC address of the second endpoint device in the service packet to the original MAC address corresponding to the second endpoint device, and sends a modified service packet to the user corresponding to the original MAC address corresponding to the second endpoint device.

It should be noted that, the second endpoint device may determine, based on the specific local MAC address of the second endpoint device, the original MAC address corresponding to the second endpoint device with reference to specific descriptions in step 805 that the second network device determines, based on the specific local MAC address of the second endpoint device, the original MAC address corresponding to the second endpoint device. Details are not described herein.

In comparison with the embodiments shown in FIG. 8 to FIG. 19, in the embodiment shown in FIG. 20, the endpoint device may sense the specific local MAC address of the endpoint device, and when receiving the service packet of the user, set the source MAC address of the service packet to the specific local MAC address of the endpoint device, set the destination MAC address of the service packet to a specific local MAC address of a peer endpoint device, and send the service packet carrying the specific local MAC address of the endpoint device and the specific local MAC address of the peer endpoint device to a network device, so that the network device forwards the service packet based on the specific local MAC address of the peer endpoint device until the service packet is forwarded to the peer endpoint device.

In comparison with the embodiments shown in FIG. 8 to FIG. 19, in the embodiment shown in FIG. 20, the network device may not need to perform actions such as modifying the original MAC address corresponding to the endpoint device to the specific local MAC address of the endpoint device, and modifying the specific local MAC address of the endpoint device to the original MAC address corresponding to the endpoint device in FIG. 8 to FIG. 19. This can reduce processing complexity of the network device.

Figure 21:
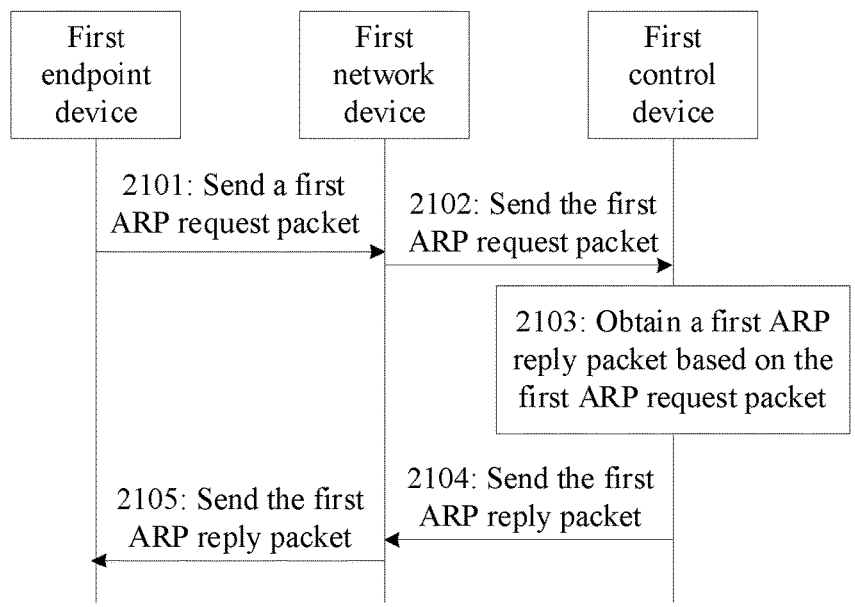
FIG. 21 is a schematic diagram of a specific local MAC address learning procedure according to an embodiment of this disclosure.

In comparison with that, in the foregoing embodiments shown in FIG. 8 to FIG. 20, the endpoint device performs the specific local MAC address learning procedure through the network device on a forwarding plane, as shown in FIG. 21, the endpoint device may alternatively complete the specific local MAC address learning procedure by combining a control plane and a forwarding plane, to reduce a disadvantage (for example, a broadcast storm and a traffic self-loop) of conventional broadcast processing on the forwarding plane through optimization and processing of the control plane.

FIG. 21 is a schematic diagram of a specific local MAC address learning procedure according to an embodiment of this disclosure. As shown in FIG. 21, the method may include the following steps.

Step 2101: A first endpoint device sends a first ARP request packet to a first network device.

A destination IP address of the first ARP request packet is an IP address corresponding to a second endpoint device, and the first ARP request packet is used to request a specific local MAC address of the second endpoint device.

For example, the first ARP request packet may be the ARP request packet described in step 1501, or may be the ARP reply packet described in step 2002. This is not limited.

Step 2102: The first network device sends the first ARP request packet to a first control device.

Figure 22:
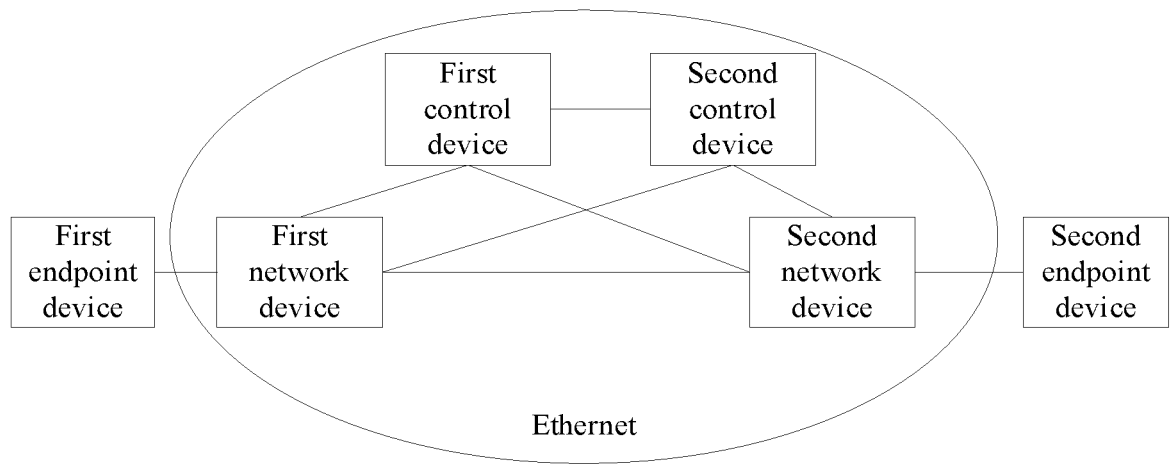
FIG. 22 is a schematic diagram of a low-delay network interconnection architecture according to an embodiment of this disclosure.

As shown in FIG. 22, the first control device may be a local control device corresponding to the first network device. The first control device may generate a specific local MAC address of a locally corresponding endpoint device and send the specific local MAC address to the first network device. The first network device may also generate the specific local MAC address of the endpoint device corresponding to the first network device with reference to descriptions shown in FIG. 15.

For a process in which the first control device generates the specific local MAC address of the locally corresponding endpoint device, refer to specific descriptions in FIG. 8 to FIG. 21 that the network device determines the specific local MAC address of the endpoint device. Details are not described herein.

It should be noted that, when the first ARP request packet is the ARP request packet described in step 1501, the first network device may modify an original MAC address corresponding to the first endpoint device in the first ARP request packet to a specific local MAC address of the first endpoint device, and send a modified first ARP request packet to the first control device, or may directly send the first ARP request packet to the first control device. When the first ARP request packet is the ARP reply packet described in step 2002, the first network device may directly send the first ARP request packet to the first control device.

Step 2103: The first control device obtains a first ARP reply packet based on the first ARP request packet.

A source MAC address in an ARP header of the first ARP reply packet is the specific local MAC address of the second endpoint device.

For example, the first control device may determine, based on a locally stored IP address and a specific local MAC address corresponding to the IP address, whether an IP address corresponding to the second endpoint device is included. If the IP address corresponding to the second endpoint device is included, the first control device may determine the first ARP reply packet based on the specific local MAC address corresponding to the IP address corresponding to the second endpoint device.

Optionally, the first control device receives the IP address and the specific local MAC address corresponding to the IP address that are sent by a second control device, and locally stores the IP address and the specific local MAC address corresponding to the IP address.

As shown in FIG. 22, the second control device may be a local control device corresponding to a second network device, and the second control device may generate the specific local MAC address of the locally corresponding endpoint device.

For a process in which the second control device generates the specific local MAC address of the locally corresponding endpoint device, refer to specific descriptions in FIG. 8 to FIG. 21 that the network device determines the specific local MAC address of the endpoint device. Details are not described herein.

Optionally, the IP address and the specific local MAC address corresponding to the IP address that are sent by the second control device may include the IP address corresponding to the second endpoint device and the specific local MAC address corresponding to the IP address.

Step 2104: The first control device sends the first ARP reply packet to the first network device.

Step 2105: The first network device sends the first ARP reply packet to the first endpoint device.

In correspondence to that, in step 2103, the first control device determines the specific local MAC address of the second endpoint device based on the locally stored IP address and the specific local MAC address corresponding to the IP address, when the locally stored IP address and the specific local MAC address corresponding to the IP address in the first control device does not include the IP address corresponding to the second endpoint device and the specific local MAC address corresponding to the IP address, the first control device may broadcast the first ARP request packet.

In a possible design, the second network device receives the first ARP request packet. With reference to descriptions of step 1504 to step 1507, the second network device and the second endpoint device obtain the first ARP reply packet, and send the first ARP reply packet to the first endpoint device through the first network device.

In another possible design, after receiving the first ARP request packet, the second network device determines the first ARP reply packet based on the determined specific local MAC address of the second endpoint device, and sends the first ARP reply packet to the first endpoint device through the first network device.

Optionally, the second network device reports the first ARP request packet to the second control device, and triggers the second control device to synchronize, to the first control device, the locally stored IP address and the specific local MAC address corresponding to the IP address.

Based on the foregoing two possible designs, optionally, when a source MAC address of the first ARP request packet is the original MAC address corresponding to the first endpoint device, the first control device modifies the original MAC address corresponding to the first endpoint device to the specific local MAC address of the first endpoint device, and broadcasts the modified first ARP request packet.

In correspondence to that the first control device obtains the first ARP reply packet based on the first ARP request packet of the first endpoint device, the first control device may also receive a second ARP request packet of the second endpoint device reported by the first network device. The second ARP request packet is used to request the specific local MAC address of the first endpoint device.

The first control device may determine the specific local MAC address of the first endpoint device based on the second ARP request packet, determine a second ARP reply packet based on the specific local MAC address of the first endpoint device, and send the second ARP reply packet to the second endpoint device through the first network device and the second network device.

A source MAC address in an ARP header of the second ARP reply packet is the specific local MAC address of the first endpoint device.

Optionally, when receiving the second ARP reply packet, the first control device triggers the first control device to synchronize, to the second control device, the locally stored IP address and the specific local MAC address corresponding to the IP address.

In this embodiment of this disclosure, a specific local MAC address learning procedure is completed by combining a control plane and a forwarding plane, so that a disadvantage of conventional broadcast processing on the forwarding plane can be reduced through optimization and processing of the control plane.

Figure 23:
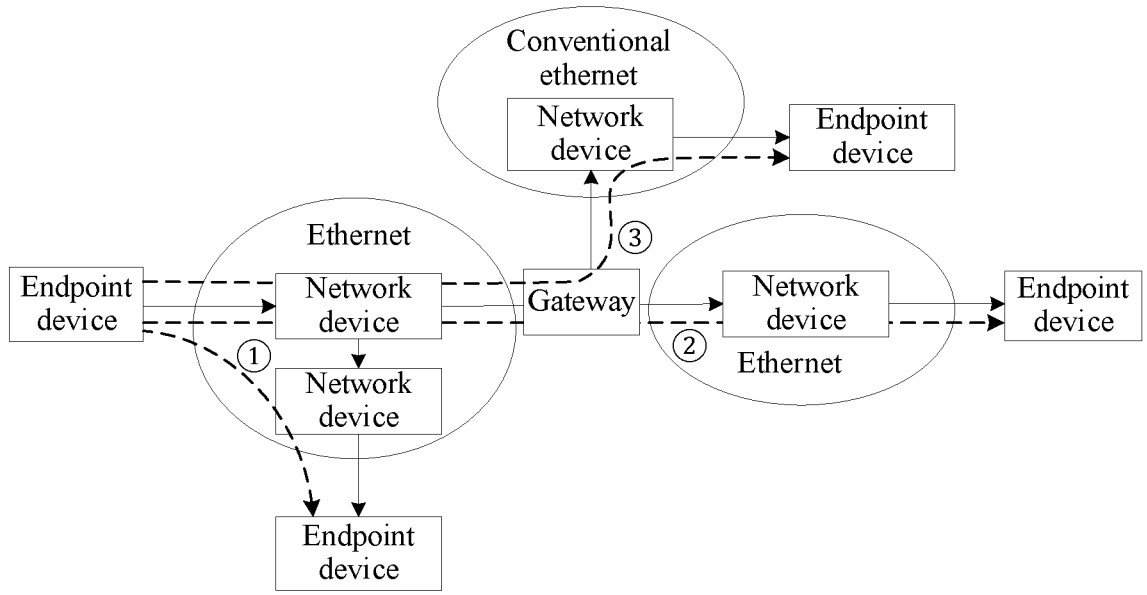
FIG. 23 is a schematic diagram of a network interconnection architecture according to an embodiment of this disclosure.

Based on the embodiments shown in FIG. 8 to FIG. 22, as shown in ① in FIG. 23, communication between endpoint devices may be performed through an Ethernet provided in this disclosure. In comparison with a conventional Ethernet, complex processing such as encapsulation and decapsulation is not required, thereby reducing a packet forwarding delay and processing complexity. As shown in ② in FIG. 23, there may also be a plurality of Ethernets shown in this disclosure in a network, and interconnection between Ethernets may be implemented through a layer 3 switch as a gateway to expand a network capacity. As shown in ③ in FIG. 23, an Ethernet provided in this disclosure may be further used in combination with the conventional Ethernet through a gateway. In this way, the network capacity is expanded and network deployment flexibility is improved.

The conventional Ethernet may refer to a layer 2 network architecture in which packet forwarding is performed based on an original MAC address, or a network interconnection architecture in which a layer 2 network and a layer 3 network are combined for table lookup and forwarding based on an IP address.

The foregoing mainly describes the solutions provided in embodiments of this disclosure from a perspective of interaction between devices. It may be understood that, to implement the foregoing functions, devices include corresponding hardware structures and/or software modules for performing the functions. A person skilled in the art should easily be aware that, in combination with algorithm steps of the examples described in embodiments disclosed in this specification, this disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In embodiments of this disclosure, each device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this disclosure, division into modules is an example, and is merely logical function division. During actual implementation, another division manner may be used.

Figure 24:
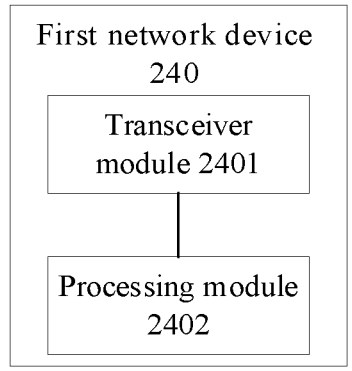
FIG. 24 is a schematic diagram of composition of a first network device according to an embodiment of this disclosure.

When each functional module is obtained through division based on each corresponding function, FIG. 24 shows a first network device 240. The first network device 240 may include a transceiver module 2401 and a processing module 2402. For example, the first network device 240 may be a first network device, or may be a chip used in the first network device or another combined device, component, or the like that has a function of the foregoing first network device. When the first network device 240 is a first network device, the transceiver module 2401 may be a transceiver, where the transceiver may include an antenna, a radio frequency circuit, and the like, and the processing module 2402 may be a processor (or a processing circuit), for example, a baseband processor, where the baseband processor may include one or more CPUs. When the first network device 240 is a component that has a function of the foregoing first network device, the transceiver module 2401 may be a radio frequency unit, and the processing module 2402 may be a processor (or a processing circuit), for example, a baseband processor. When the first network device 240 is a chip system, the transceiver module 2401 may be an input/output interface of a chip (for example, a baseband chip), and the processing module 2402 may be a processor (or a processing circuit) of the chip system, and may include one or more CPUs. It should be understood that the transceiver module 2401 in this embodiment of this disclosure may be implemented by a transceiver or a transceiver-related circuit component, and the processing module 2402 may be implemented by a processor or a processor-related circuit component (or referred to as a processing circuit).

For example, the transceiver module 2401 may be configured to perform all sending and receiving operations performed by the first network device in the embodiments shown in FIG. 8 to FIG. 23, and/or configured to support another process of the technology described in this specification. The processing module 2402 may be configured to perform all operations other than sending and receiving operations performed by the first network device in the embodiments shown in FIG. 8 to FIG. 23, and/or configured to support another process of the technology described in this specification.

In another possible implementation, the transceiver module 2401 in FIG. 24 may be replaced with a transceiver, and the transceiver may integrate a function of the transceiver module 2401. The processing module 2402 may be replaced with a processor, and the processor may integrate a function of the processing module 2402. Further, the first network device 240 shown in FIG. 24 may further include a memory. When the transceiver module 2401 is replaced by a transceiver, and the processing module 2402 is replaced by a processor, the first network device 240 in this embodiment of this disclosure may be considered as the communication apparatus shown in FIG. 7.

Figure 25:
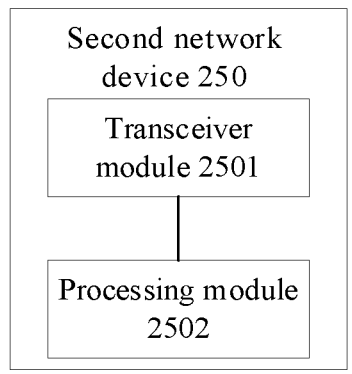
FIG. 25 is a schematic diagram of composition of a second network device according to an embodiment of this disclosure.

When each functional module is obtained through division based on each corresponding function, FIG. 25 shows a second network device 250. The second network device 250 may include a transceiver module 2501 and a processing module 2502. For example, the second network device 250 may be a second network device, or may be a chip used in the second network device or another combined device, component, or the like that has a function of the foregoing second network device. When the second network device 250 is a second network device, the transceiver module 2501 may be a transceiver, where the transceiver may include an antenna, a radio frequency circuit, and the like, and the processing module 2502 may be a processor (or a processing circuit), for example, a baseband processor, where the baseband processor may include one or more CPUs. When the second network device 250 is a component that has a function of the foregoing second network device, the transceiver module 2501 may be a radio frequency unit, and the processing module 2502 may be a processor (or a processing circuit), for example, a baseband processor. When the second network device 250 is a chip system, the transceiver module 2501 may be an input/output interface of a chip (for example, a baseband chip), and the processing module 2502 may be a processor (or a processing circuit) of the chip system, and may include one or more CPUs. It should be understood that the transceiver module 2501 in this embodiment of this disclosure may be implemented by a transceiver or a transceiver-related circuit component, and the processing module 2502 may be implemented by a processor or a processor-related circuit component (or referred to as a processing circuit).

For example, the transceiver module 2501 may be configured to perform all sending and receiving operations performed by the second network device in the embodiments shown in FIG. 8 to FIG. 23, and/or configured to support another process of the technology described in this specification. The processing module 2502 may be configured to perform all operations other than sending and receiving operations performed by the second network device in the embodiments shown in FIG. 8 to FIG. 23, and/or configured to support another process of the technology described in this specification.

In another possible implementation, the transceiver module 2501 in FIG. 25 may be replaced with a transceiver, and the transceiver may integrate a function of the transceiver module 2501. The processing module 2502 may be replaced with a processor, and the processor may integrate a function of the processing module 2502. Further, the second network device 250 shown in FIG. 25 may further include a memory. When the transceiver module 2501 is replaced by a transceiver, and the processing module 2502 is replaced by a processor, the second network device 250 in this embodiment of this disclosure may be considered as the communication apparatus shown in FIG. 7.

Figure 26:
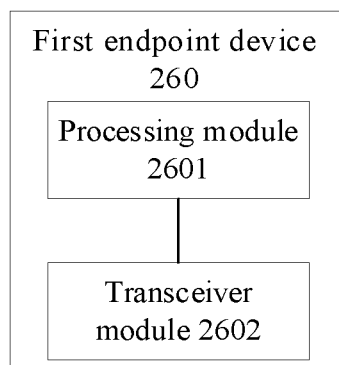
FIG. 26 is a schematic diagram of composition of a first endpoint device according to an embodiment of this disclosure.

When each functional module is obtained through division based on each corresponding function, FIG. 26 shows a first endpoint device 260. The first endpoint device 260 may include a processing module 2601 and a transceiver module 2602. For example, the first endpoint device 260 may be a first endpoint device, or may be a chip used in the first endpoint device or another combined device, component, or the like that has a function of the foregoing first endpoint device. When the first endpoint device 260 is a first endpoint device, the transceiver module 2602 may be a transceiver, where the transceiver may include an antenna, a radio frequency circuit, and the like, and the processing module 2601 may be a processor (or a processing circuit), for example, a baseband processor, where the baseband processor may include one or more CPUs. When the first endpoint device 260 is a component that has a function of the foregoing first endpoint device, the transceiver module 2602 may be a radio frequency unit, and the processing module 2601 may be a processor (or a processing circuit), for example, a baseband processor. When the first endpoint device 260 is a chip system, the transceiver module 2602 may be an input/output interface of a chip (for example, a baseband chip), and the processing module 2601 may be a processor (or a processing circuit) of the chip system, and may include one or more CPUs. It should be understood that the transceiver module 2602 in this embodiment of this disclosure may be implemented by a transceiver or a transceiver-related circuit component, and the processing module 2601 may be implemented by a processor or a processor-related circuit component (or referred to as a processing circuit).

For example, the processing module 2601 may be configured to perform all operations other than the sending and receiving operations performed by the first endpoint device in the embodiments shown in FIG. 8 to FIG. 23, and/or configured to support another process of the technology described in this specification. The transceiver module 2602 may be configured to perform all sending and receiving operations performed by the first endpoint device in the embodiments shown in FIG. 8 to FIG. 23, and/or configured to support another process of the technology described in this specification.

In another possible implementation, the processing module 2601 in FIG. 26 may be replaced with a processor, and the processor may integrate a function of the processing module 2601. The transceiver module 2602 may be replaced with a transceiver, and the transceiver may integrate a function of the transceiver module 2602. Further, the first endpoint device 260 shown in FIG. 26 may further include a memory. When the processing module 2601 is replaced by a processor, and the transceiver module 2602 is replaced by a transceiver, the first endpoint device 260 in this embodiment of this disclosure may be considered as the communication apparatus shown in FIG. 7.

Figure 27:
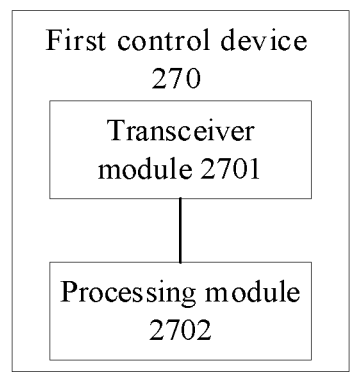
FIG. 27 is a schematic diagram of composition of a first control device according to an embodiment of this disclosure.

When each functional module is obtained through division based on each corresponding function, FIG. 27 shows a first control device 270. The first control device 270 may include a transceiver module 2701 and a processing module 2702. For example, the first control device 270 may be a first control device, or may be a chip used in the first control device or another combined device, component, or the like that has a function of the foregoing first control device. When the first control device 270 is a first control device, the transceiver module 2701 may be a transceiver, where the transceiver may include an antenna, a radio frequency circuit, and the like, and the processing module 2702 may be a processor (or a processing circuit), for example, a baseband processor, where the baseband processor may include one or more CPUs. When the first control device 270 is a component that has a function of the foregoing first control device, the transceiver module 2701 may be a radio frequency unit, and the processing module 2702 may be a processor (or a processing circuit), for example, a baseband processor. When the first control device 270 is a chip system, the transceiver module 2701 may be an input/output interface of a chip (for example, a baseband chip), and the processing module 2702 may be a processor (or a processing circuit) of the chip system, and may include one or more CPUs. It should be understood that the transceiver module 2701 in this embodiment of this disclosure may be implemented by a transceiver or a transceiver-related circuit component, and the processing module 2702 may be implemented by a processor or a processor-related circuit component (or referred to as a processing circuit).

For example, the transceiver module 2701 may be configured to perform all sending and receiving operations performed by the first control device in the embodiments shown in FIG. 8 to FIG. 23, and/or configured to support another process of the technology described in this specification. The processing module 2702 may be configured to perform all operations other than sending and receiving operations performed by the first control device in the embodiments shown in FIG. 8 to FIG. 23, and/or configured to support another process of the technology described in this specification.

In another possible implementation, the transceiver module 2701 in FIG. 27 may be replaced with a transceiver, and the transceiver may integrate a function of the transceiver module 2701. The processing module 2702 may be replaced with a processor, and the processor may integrate a function of the processing module 2702. Further, the first control device 270 shown in FIG. 27 may further include a memory. When the transceiver module 2701 is replaced by a transceiver, and the processing module 2702 is replaced by a processor, the first control device 270 in this embodiment of this disclosure may be considered as the communication apparatus shown in FIG. 7.

An embodiment of this disclosure further provides a computer-readable storage medium. All or some of the procedures in the foregoing method embodiments may be implemented by a computer program instructing related hardware. The program may be stored in the computer-readable storage medium. When the program is executed, the procedures of the foregoing method embodiments may be included. The computer-readable storage medium may be an internal storage unit of the terminal (including a data transmitting end and/or a data receiving end) in any one of the foregoing embodiments, for example, a hard disk or memory of the terminal. Alternatively, the computer-readable storage medium may be an external storage device of the terminal, for example, a plug-in hard disk, a smart media card (SMC), a Secure Digital (SD) card, a flash card, or the like that is configured on the terminal. Further, the computer-readable storage medium may alternatively include both the internal storage unit and the external storage device of the terminal. The computer-readable storage medium is configured to store the computer program and other programs and data that are required by the terminal. The computer-readable storage medium may be further configured to temporarily store data that has been output or is to be output.

It should be noted that, in the specification, claims, and accompanying drawings of this disclosure, the terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this disclosure, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate the following three cases: only A exists, only B exists, and both A and B exist, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

Based on the descriptions of the implementations, a person skilled in the art may clearly understand that, for the purpose of convenient and brief description, division into the foregoing functional modules is merely used as an example for description. During actual application, the functions may be allocated to different functional modules for implementation based on a requirement. In other words, an inner structure of an apparatus is divided into different functional modules to implement all or some of the functions described above.

In the several embodiments provided in this disclosure, it should be understood that the disclosed apparatus and method may be implemented in other manners. For example, the described apparatus embodiments are merely examples. For example, division into the modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this disclosure essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement within the technical scope disclosed in this disclosure shall fall within the protection scope of this disclosure.

Therefore, the protection scope of this disclosure shall be subject to the protection scope of the claims.

What is claimed is:

1. A method implemented by a first network device, wherein the method comprises:
receiving, from a first endpoint device, a service packet, wherein a first destination media access control (MAC) address of the service packet is a first local MAC address of a second endpoint device, wherein the first local MAC address comprises an indication prefix and first location information, wherein the indication prefix indicates that the first local MAC address comprises the first location information, and wherein the first location information indicates an access location of the second endpoint device in a network;
determining, from a preset routing table and based on the first location information, an egress port corresponding to the first location information, wherein the preset routing table comprises the first location information and the egress port; and
sending, through the egress port, the service packet, wherein the access location indicates a second network device accessed by the second endpoint device and a first port through which the second endpoint device accesses the second network device.

2. The method of claim 1, wherein before receiving the service packet, the method further comprises:
receiving, from the first endpoint device, an Address Resolution Protocol (ARP) request packet, wherein a first source MAC address of the ARP request packet is a first original MAC address corresponding to the first endpoint device and is in a first ARP header of the ARP request packet, and wherein a destination Internet Protocol (IP) address of the ARP request packet corresponds to the second endpoint device;
modifying the first source MAC address to a second local MAC address of the first endpoint device to obtain a modified ARP request packet; and
broadcasting the modified ARP request packet.

3. The method of claim 2, wherein the first original MAC address is either,
a second original MAC address of the first endpoint device; or
a third original MAC address of a user corresponding to the first endpoint device.

4. The method of claim 2, further comprising:
determining, based on the first network device being accessed by the first endpoint device, a device identifier corresponding to the first endpoint device;
determining, based on the first endpoint device accessing the first network device through a first port, a port identifier corresponding to the first endpoint device;
determining, based on the device identifier and the first port, second location information of the first endpoint device; and
determining, based on the second location information, the second local MAC address.

5. The method of claim 2, further comprising:
obtaining, a first correspondence comprising a port identifier and second location information corresponding to the port identifier and corresponding to a first port through which the first endpoint device accesses the first network device;
determining, based on the correspondence, the second location information as third location information of the first endpoint device; and
determining, based on the third location information, the local MAC address.

6. The method of claim 3, wherein the first local MAC address further comprises a user identifier indicating the third original MAC address when the first original MAC address is the third original MAC address.

7. The method of claim 6, further comprising:
determining, based on the first network device being accessed by the first endpoint device, a device identifier corresponding to the first endpoint device;
determining, based on the first endpoint device accessing the first network device through a first port, a port identifier corresponding to the first endpoint device; and
determining, based on the device identifier and the port identifier, second location information of the first endpoint device.

8. The method of claim 6, further comprising:
obtaining a correspondence between a port identifier and second location information corresponding to the port identifier and corresponding to a port through which the first endpoint device accesses the first network device; and
determining, based on the correspondence, the second location information as third location information of the first endpoint device.

9. The method according of claim 7, further comprising:
obtaining, a correspondence between the third original MAC address and the user identifier;
determining, based on the correspondence, the user identifier; and
determining, based on the second location information and the user identifier, the second local MAC address.

10. The method of claim 6, further comprising:
determining, based on the first network device being accessed by the first endpoint device, a device identifier corresponding to the first endpoint device;
obtaining, a third correspondence among the third original MAC address, a port identifier, and the user identifier;
determining, based on the correspondence, the port identifier and the user identifier; and
determining, based on the device identifier, the port identifier, and the user identifier, the second local MAC address.

11. The method of claim 2, wherein a source IP address of the ARP request packet is a first IP address corresponding to the first endpoint device, and wherein the method further comprises:
identifying the first IP address is a second IP address of a user corresponding to the first endpoint device; and
storing, in response to identifying that the first IP address is the second IP address and based on the ARP request packet, the second IP address and a second original MAC address corresponding to the second IP address.

12. The method of claim 2, further comprising:
obtaining an ARP reply packet, wherein a second destination MAC address of the ARP reply packet is the specific second local MAC address, and wherein a second source MAC address in a second ARP header of the ARP reply packet is the first local MAC address;
modifying, the second local MAC address in a layer 2 header of the ARP reply packet to the first original MAC address to obtain a modified ARP reply packet; and
sending, to the first endpoint device, the modified ARP reply packet.

13. A method implemented by a network device, wherein the method comprises:
- obtaining a service packet of a first endpoint device, wherein a first destination media access control (MAC) address of the service packet is a first local MAC address of a second endpoint device, wherein the first local MAC address comprises an indication prefix and first location information, wherein the indication prefix indicates that the first local MAC address comprises the first location information, and wherein the first location information indicates an access location of the second endpoint device in a network;
- determining, based on the first local MAC address, an egress port;
- modifying the first local MAC address in the service packet to an original MAC address corresponding to the second endpoint device to obtain a modified service packet; and
- sending, to the second endpoint device through the egress port, the modified service packet,
- wherein determining the egress port comprises determining, from a preset routing table based on the first location information, the egress port, and wherein the preset routing table comprises the first location information and the egress port corresponding to the first location information.

14. The method of claim 13, wherein before obtaining the service packet, the method further comprises:
- obtaining, an Address Resolution Protocol (ARP) request packet, wherein a first source MAC address in a first ARP header of the ARP request packet is a second local MAC address of the first endpoint device, and wherein a destination IP address of the ARP request packet corresponds to the second endpoint device;
- broadcasting the ARP request packet;
- receiving, from the second endpoint device, an ARP reply packet, wherein a second source MAC address of the ARP reply packet is the original MAC address, and wherein a second destination MAC address of the ARP reply packet is the second local MAC address;
- modifying the original MAC address in a second ARP header of the ARP reply packet to the first local MAC address to obtain a modified ARP reply packet; and
- sending, based on the second local MAC address, the modified ARP reply packet.

15. The method of claim 13, wherein determining the egress port comprises setting a first port corresponding to the first local MAC address as the egress port.

16. The method of claim 13, wherein determining the egress port comprises:
- determining, based on the first local MAC address, the original MAC address; and
- determining, based on the original MAC address, the egress port.

17. A communication apparatus, comprising:
a memory configured to store instructions; and
one or more processors coupled to the memory and configured to execute the instructions to cause to:
- receive, from a first endpoint device, a service packet, wherein a destination media access control (MAC) address of the service packet is a local MAC address of a second endpoint device, wherein the local MAC address comprises an indication prefix and location information, wherein the indication prefix indicates that the local MAC address comprises the location information, and wherein the location information indicates an access location of the second endpoint device in a network;
- determine, from a preset routing table based on the location information, an egress port corresponding to the location information, wherein the preset routing table comprises the location information and the egress port; and
- send, through the egress port, the service packet,
- wherein the access location indicates a second network device accessed by the second endpoint device and a first port through which the second endpoint device accesses the second network device.

18. A communication apparatus comprising:
a memory configured to store instructions; and
one or more processors coupled to the memory and configured to execute the instructions to cause the communication apparatus to:
- obtain a service packet of a first endpoint device, wherein a destination media access control (MAC) address of the service packet is a local MAC address of a second endpoint device, wherein the local MAC address comprises an indication prefix and location information, wherein the indication prefix indicates that the local MAC address comprises the location information, and wherein the location information indicates an access location of the second endpoint device in a network;
- determine, based on the local MAC address, an egress port;
- modify the local MAC address in the service packet to an original MAC address corresponding to the second endpoint device to obtain a modified service packet; and
- send, to the second endpoint device through the egress port, the modified service packet,
- wherein determining the egress port comprises determining, from a preset routing table based on the location information, the egress port, and wherein the preset routing table comprises the location information and the egress port corresponding to the location information.

* * * * *

UNITED STATES PATENT AND TRADEMARK OFFICE
CERTIFICATE OF CORRECTION

PATENT NO. : 12,003,417 B2  
APPLICATION NO. : 18/472888  
DATED : June 4, 2024  
INVENTOR(S) : Junjie Niu et al.

Page 1 of 1

It is certified that error appears in the above-identified patent and that said Letters Patent is hereby corrected as shown below:

In the Claims

Claim 3, Column 55, Line 42: "address is either," should read "address is either:"

Claim 10, Column 56, Line 39: "obtaining, a third correspondence among the third original" should read "obtaining, a correspondence among the third original"

Claim 12, Column 56, Line 39: "specific second local MAC address, and wherein a" should read "second local MAC address, and wherein a"

Claim 17, Column 58, Line 4: "configured to execute the instructions to cause to:" should read "configured to execute the instructions to cause the communication apparatus to:"

Signed and Sealed this  
Thirtieth Day of July, 2024

Katherine Kelly Vidal  
*Director of the United States Patent and Trademark Office*